US012783893B2

(12) United States Patent
Blaskova et al.

(10) Patent No.: US 12,783,893 B2
(45) Date of Patent: Nov. 3, 2026

(54) KNAPSACK-BASED RECOMMENDATION ENGINE

(71) Applicant: SAP SE, Walldorf (DE)

(72) Inventors: Barbora Blaskova, Kosice (SK); Nitin Chavan, Gadag (IN); Gaurav Vanawat, Bangalore (IN); Sudhir Verma, Gurgaon (IN); Rohan Koul, Jammu (IN); Rajeev Kansal, Bangalore (IN); Shubham Gupta, New Delhi (IN)

(73) Assignee: SAP SE, Walldorf (DE)

( * ) Notice: Subject to any disclaimer, the term of this patent is extended or adjusted under 35 U.S.C. 154(b) by 499 days.

(21) Appl. No.: 18/388,020

(22) Filed: Nov. 8, 2023

(65) Prior Publication Data

US 2025/0148348 A1 May 8, 2025

(51) Int. Cl.
*G06N 3/088* (2023.01)

(52) U.S. Cl.
CPC .................................... *G06N 3/088* (2013.01)

(58) Field of Classification Search
CPC ...................................................... G06N 3/088
See application file for complete search history.

(56) References Cited

U.S. PATENT DOCUMENTS

| | | | | |
|---|---|---|---|---|
| 11,803,402 | B1 * | 10/2023 | Gupta | G06F 3/0484 |
| 2012/0254435 | A1 * | 10/2012 | Zhaofu | G06F 16/27 709/226 |
| 2014/0006861 | A1 * | 1/2014 | Jain | H04L 41/5074 714/E11.178 |
| 2014/0344101 | A1 * | 11/2014 | Collet | G06Q 30/0631 705/26.7 |
| 2018/0203755 | A1 * | 7/2018 | Das | G06F 11/0709 |
| 2018/0322508 | A1 * | 11/2018 | Walthers | G06F 40/186 |
| 2021/0028975 | A1 * | 1/2021 | Mortensen | H04L 41/0636 |
| 2024/0168967 | A1 * | 5/2024 | Wigglesworth | G06F 16/285 |
| 2024/0232804 | A9 * | 7/2024 | Kumar | G06N 3/08 |

OTHER PUBLICATIONS

Khemaja et al, Towards a Knapsack Model for optimizing e-Training services delivery: Application to Hybrid Intelligent Tutoring Systems, CENTERIS—International Conference on ENTERprise Information Systems; Procedia Computer Science 164 (2019), pp. 257-264. (Year: 2019).*
Sivaramakrishnan et al, "Recommending Customizable Products: A Multiple Choice Knapsack Solution", WIMS, Jul. 13-15, 2015, Larnaca, Cyprus, 10 pp. (Year: 2015).*

* cited by examiner

*Primary Examiner* — Marc S Somers
(74) *Attorney, Agent, or Firm* — SCHWEGMAN LUNDBERG & WOESSNER, P.A.

(57) ABSTRACT

A machine-learning model is trained to cluster support requests based on the contents of the support requests. A user of the recommendation system may select a set of support requests to be clustered. Based on the selected set of support requests, the trained machine-learning model may be tuned and used to cluster the selected set of support requests. Using the characteristics of the support requests in one or more generated insights, one or more tools suitable for providing automated support for the cluster of support requests may be identified. Using a knapsack-based approach, one or more of the identified tools is selected for recommendation to the user.

20 Claims, 12 Drawing Sheets

700

| HISTORICAL DATA (710) | | | |
|---|---|---|---|
| COMPONENT (720) | DATA | START DATE | END DATE |
| PROGRAM1 (730A) | ... | 1/1/2021 | 2/2/2021 |
| PROGRAM2 (730B) | ... | 1/2/2021 | 1/7/2021 |
| PROGRAM1 (730C) | ... | 7/6/2022 | 7/8/2022 |

| TOOLS (740) | | | |
|---|---|---|---|
| NAME (750) | EFFORT | IMPACT | RATIO |
| SUPPORT ASSISTANT TREE (760A) | 35 | 280 | 8 |
| CORRECTION PREDICTOR (760B) | 5 | 300 | 60 |
| KEYWORD RECOMMENDER (760C) | 15 | 100 | 6.6 |

*FIG. 7*

KNAPSACK-BASED RECOMMENDATION ENGINE

TECHNICAL FIELD

The subject matter disclosed herein generally relates to recommendation engines. Specifically, the present disclosure addresses systems and methods to provide a knapsack-based recommendation engine.

BACKGROUND

Companies that provide products to customers also provide support for those products. As the number of customers and products increases, the number of support incidents and the complexity in responding to each incident increases. With a limited amount of support staff, a backlog of support requests may begin to build and grow.

Automated support systems, such as support assistant trees, interactive documentation, and troubleshooting wizards, may be made available to customers to enable them to solve problems without interacting with support staff. However, deploying an automated support system also consumes resources. Support team managers determine whether to deploy automated support systems, and which automated support systems to deploy, based on their familiarity with the products and the support systems, as well as their experience in providing support.

BRIEF DESCRIPTION OF THE DRAWINGS

FIG. 7 is a block diagram illustrating a database schema suitable for use by a knapsack-based recommendation engine, according to some example embodiments.

DETAILED DESCRIPTION

Figure 1:
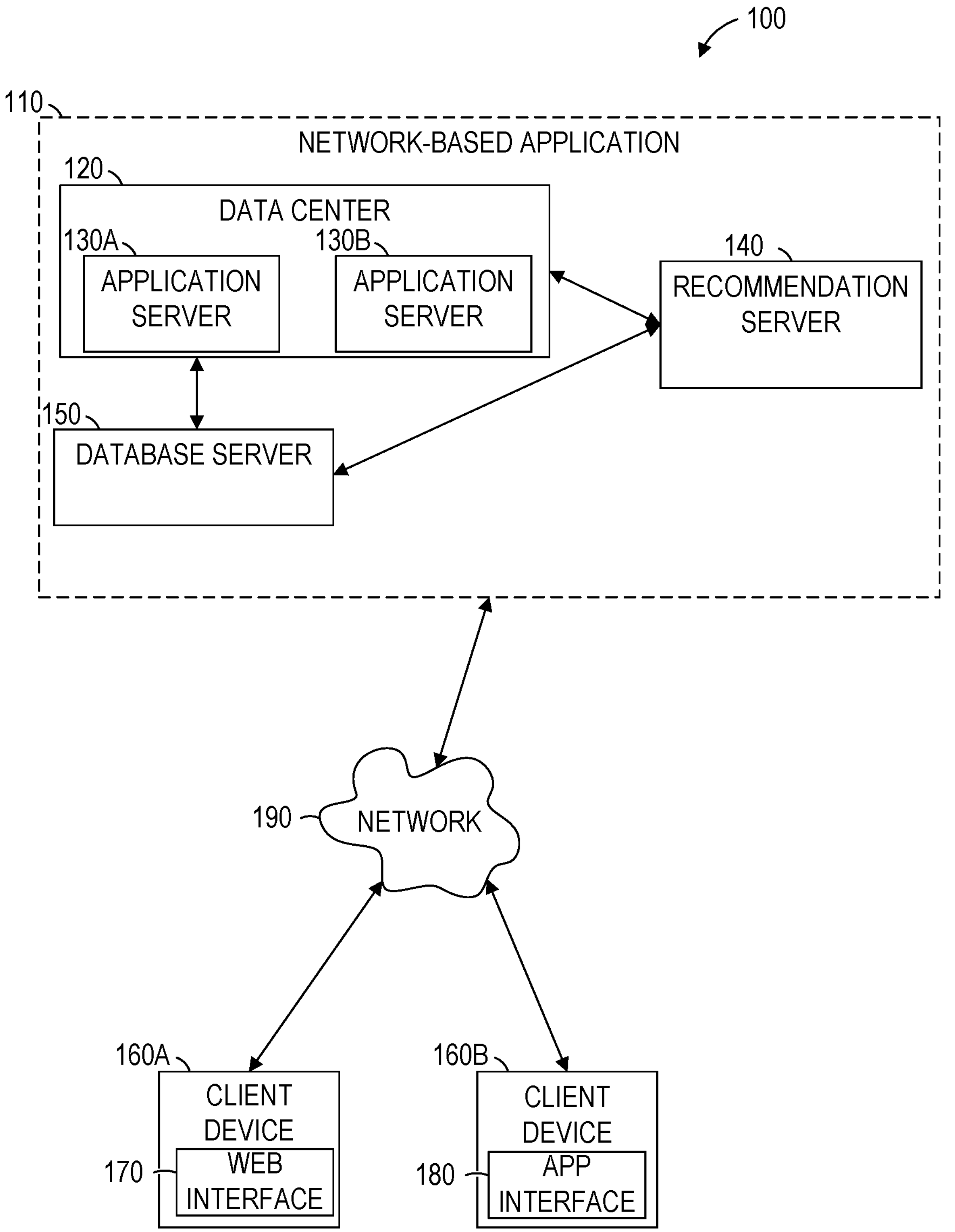
FIG. 1 is a network diagram illustrating an example network environment suitable for a knapsack-based recommendation engine.

Example methods and systems are directed to generating recommendations for automated support tools to deploy to better provide support for one or more products. A machine-learning model is trained to cluster support requests (also referred to as support tickets) based on the contents of the support requests. For example, the support requests may include structured data that identifies a date of the request, a product or product component that the request applies to, a customer that submitted the request, or any suitable combination thereof. The support requests will also include unstructured data, such as text that describes the problem experienced by the customer. The machine-learning model may cluster the support requests based on the structured and unstructured data. For example, a semantic meaning may be determined for the text of each support request and the support requests may be clustered such that support requests with similar semantic meaning are placed in the same cluster and support requests with substantially different semantic meanings are placed in different clusters.

A user of the recommendation system may select a set of support requests to be clustered based on the application component. Based on the selected set of support requests, the hyperparameters (e.g., the weights of the top layer of the trained machine learning model) are tuned iteratively. Tuning is a process that adjusts model parameters to improve results. Tuning typically is performed after training and operates on a smaller data set than the data set used for training. Accordingly, customized tuning for the selected set of support requests improves results at a lower computational cost than retraining.

The number of clusters present in the selected set of support requests is not known before the clustering begins. To determine the number of clusters, the support requests are clustered into an initial number of clusters. Cosine similarity is used to check if all support requests in each cluster are related to each other. For example, a difference measure for each pair of support requests in a cluster can be determined and compared to a predetermined threshold. If the differences are all below the threshold, then the support requests in the cluster are related. If support requests in an application component are not related, then the number of clusters is too high.

Cosine similarity may also be used to check if support clusters in different clusters are related. For example, a difference measure for each pair of support requests in different clusters can be determined and compared to a predetermined threshold. If the differences are all below the threshold, the support requests in different clusters are unrelated. If the support requests in different clusters are related, then the number of clusters is too low.

Based on the results of the Cosine similarity check, the number of clusters may be increased or decreased and the clustering repeated. Multiple iterations may be performed to find the clusters present within the selected set of support requests.

Using the characteristics of the support requests in each cluster, one or more tools suitable for providing automated support for the cluster of support requests may be identified. The cost (e.g., in man-hours) of implementing each tool, the number of support requests that benefit from implementation of the tool, or both are determined. Using a knapsack-based approach, one or more of the identified tools is selected for recommendation to the user.

A knapsack optimization algorithm operates analogously to packing a knapsack of finite volume. The objective of the algorithm is to place objects in the knapsack with a maximum total value, given that not all objects will fit in the knapsack. In the systems discussed herein, the "volume" of the knapsack is the amount of resources available to improve support request processing, the "volume" of each tool is the amount of resources consumed by implementing the tool, and the "value" (or impact) of each tool is the amount of resources saved by implementing the tool.

Using the systems and methods described herein, efforts involved in selecting tools to improve product support are reduced and the impact of the selected tools is increased. Improving the impact of the support tools decreases the time and effort spent in providing product support and compared to the implementation of less-effective tools, decreases energy consumption by processors and other devices in handling support requests.

FIG. 1 is a network diagram illustrating an example network environment 100 suitable for a knapsack-based recommendation engine. The network environment 100 includes the network-based application 110, client devices 160A and 160B, and a network 190. The network-based application 110 is provided by application servers 130A and 130B in communication with a database server 150 and a recommendation server 140. The application servers 130A-130B are part of a data center 120. The data center 120 allocates resources to the application according to configuration data. For example, a number of processors, number of servers, amount of memory, amount of network bandwidth, and other resources may be configurable.

The application servers 130A-130B access application data (e.g., application data stored by the database server 150) to provide one or more applications to the client devices 160A and 160B via a web interface 170 or an application interface 180. The client devices 160A and 160B may be referred to generically as a client device 160 or in the aggregate as client devices 160. Similarly, the application servers 130A and 130B may be referred to generically as an application server 130 or in the aggregate as application servers 130.

An organization may use the data center 120 to provide support for products (e.g., software products, hardware computing products such as IoT devices, or products unrelated to computing such as cars, appliances, and the like). The application servers 130 may provide an automated support system to help users of the products resolve problems without involving a customer support representative. The automated support system may include one or more tools selected from a plurality of tools. The available tools may include a support assistant tree that guides a user through a series of questions. Based on the answers provided by the user, a leaf node of the tree is reached that provides the user with a recommendation to address their problem. Another tool that may be available is a troubleshooting program that runs diagnostics on the user's device (e.g., to troubleshoot a computing or software product). The results produced by the diagnostics may allow the troubleshooting program to automatically detect and fix errors in the product.

The recommendation server 140 may analyze data relating to support for a product (e.g., support tickets stored by the database server 150) to generate recommendations of tools to use to reduce the number of support tickets that require human handling. For example, a trained machine-learning model may be used to determine that a cluster of support tickets all relate to a particular feature of the product and that a majority of the support tickets in the cluster were handled by advising the user to perform a particular action. Based on the determination made by the machine-learning model, the recommendation server 140 may generate a recommendation to provide a support assistant tree that allows the user to determine that they are experiencing a known problem and to resolve it themselves.

The application servers 130, the database server 150, the recommendation server 140, and the client devices 160A and 160B may each be implemented in a computer system, in whole or in part, as described below with respect to FIG. 11. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application servers 130, the database server 150, the recommendation server 140, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Though FIG. 1 shows only one or two of each element (e.g., one data center 120, one network-based application 110, two application servers 130, two client devices 160, and the like), any number of each element is contemplated. For example, the database server 150 may include dozens or hundreds of active and standby servers and provide data to multiple data centers 120 that provide applications to millions of client devices. Likewise, each application server 130 may access data from multiple database servers 150, and so on.

Figure 2:
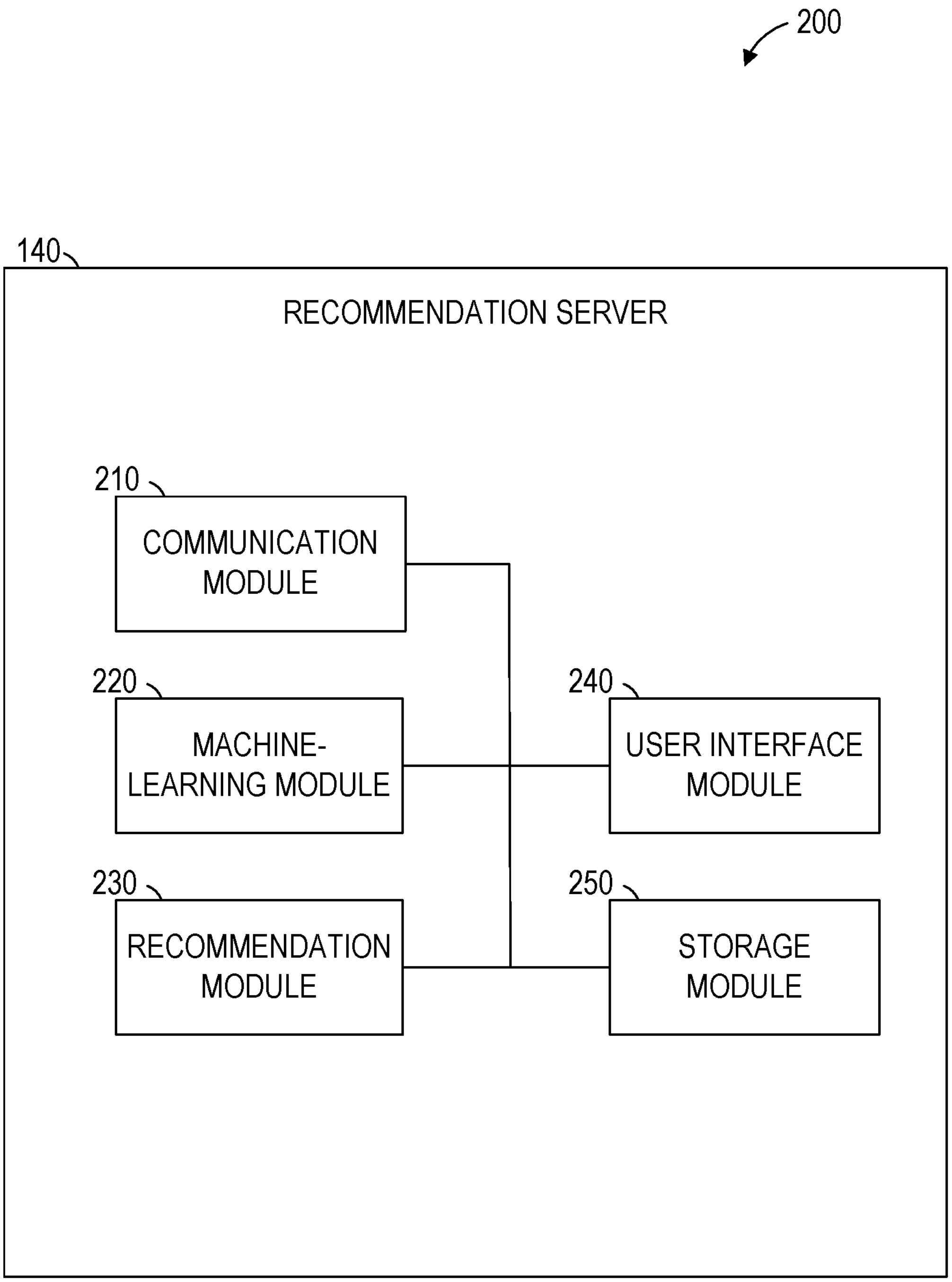
FIG. 2 is a block diagram of a recommendation server suitable for providing knapsack-based recommendations, according to some example embodiments.

FIG. 2 is a block diagram 200 of a recommendation server 140 suitable for providing knapsack-based recommendations, according to some example embodiments. The recommendation server 140 is shown as including a communication module 210, a machine-learning module 220, a recommendation module 230, a user interface module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the recommendation server 140 and transmits data from the recommendation server 140. For example, the communication module 210 may receive, from the client device 160A, a request for recommendations to improve processing and managing of high backlog queue of support requests.

The machine-learning module 220 trains a machine-learning model to generate clusters of support tickets, recommendations of tools to use for clusters of support tickets, or both. For example, the machine-learning model may be trained using past support tickets to recommend tools that would be effective in handling a significant fraction (e.g., more than 50%) of the support tickets. As another example, the machine-learning model may be trained to determine semantic meaning of support tickets, to cluster support tickets based on the semantic meanings, or both. Input text is mapped to vectors in a high-dimensional space (e.g., vectors of hundreds or thousands of elements) such that words with similar meanings have vectors that are closer together than words with dissimilar meanings. Additionally, relationships between vectors may be maintained. For example, the relationship between the vector for "king" and "queen" may be the same as the relationship between the vector for "man" and "woman." Thus, manipulation of vectors may have semantic meaning when the vectors are converted back to human-readable language.

The recommendation module 230 generates recommendations for tools to be used to improve support ticket handling. For example, a set of support tickets may be used to tune a trained machine-learning model. The tuned machine-learning model may analyze the set of support tickets and recommend one or more tools to improve handling of the support tickets. The actions recommended by recommendation module are stored into storage module 250, which is leveraged by user interface model 240 to visualize.

A user interface for configuring the recommendation server 140, for selecting support tickets to be analyzed, for managing the machine-learning model, or any suitable combination thereof may be provided by the recommendation server 140 (or an application server 130) using the user interface module 240. For example, a hypertext markup language (HTMIL) document may be generated by the user interface module 240, transmitted to a client device 160 by the communication module 210, and rendered on a display device of the client device 160 by a web browser executing on the client device 160. The user interface may comprise text fields, drop-down menus, and other input fields. For example, the user may be provided a drop-down selector widget from which one or more of a list of product or product components may be selected. Support tickets for the selected products or product components are used to determine one or more recommended tools.

Support tickets, machine-learning models, training data, or any suitable combination thereof may be stored and accessed by the storage module 250. For example, local storage of the recommendation server 140, such as a hard drive, may be used. As another example, network storage may be accessed by the storage module 250 via the network 190.

Figure 3:
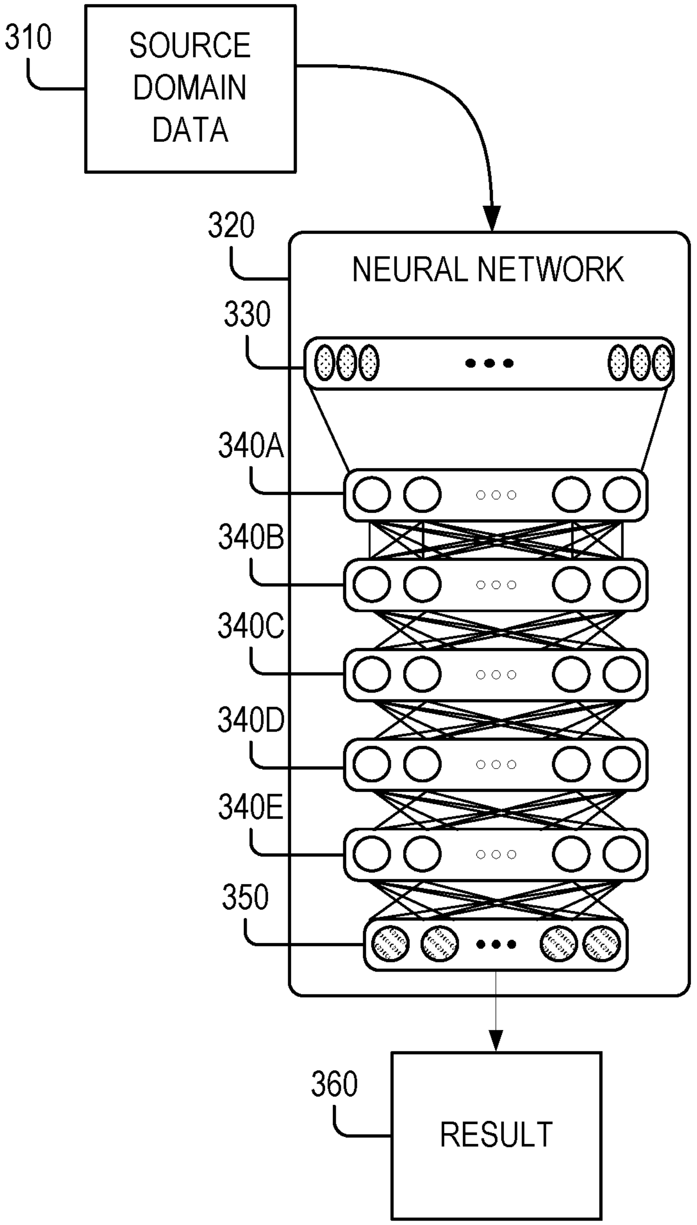
FIG. 3 is a block diagram of a neural network, suitable for use in a knapsack-based recommendation engine, according to some example embodiments.

FIG. 3 is a block diagram of a neural network 320, suitable for use in a knapsack-based recommendation engine, according to some example embodiments. The neural network 320 takes source domain data 310 as input and processes the source domain data 310 using the input layer 330; the intermediate, hidden layers 340A, 340B, 340C, 340D, and 340E; and the output layer 350 to generate a result 360.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and having learned the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 350 is the result 360. The intermediate layers 340A-340E are referred to as "hidden" because they do not interact directly with either the input or the output and are completely internal to the neural network 320. Though five hidden layers are shown in FIG. 3, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. In some example embodiments, the number of epochs is 10, 100, 500, or 1000. Within an epoch, one or more batches of the training dataset are used to train the model. Thus, the batch size ranges between 1 and the size of the training dataset while the number of epochs is any positive integer value. The model parameters are updated after each batch (e.g., using gradient descent).

For self-supervised learning, the training dataset comprises self-labeled input examples. For example, a set of color images could be automatically converted to black-and-white images. Each color image may be used as a "label" for the corresponding black-and-white image and used to train a model that colorizes black-and-white images. This process is self-supervised because no additional information, outside of the original images, is used to generate the training dataset. Similarly, when text is provided by a user, one word in a sentence can be masked and the network trained to predict the masked word based on the remaining words.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 320 may be a deep learning neural network, a deep convolutional neural network, a recurrent neural network, a transformer neural network, or another type of neural network. A neuron is an architectural element used in data processing and artificial intelligence, particularly machine learning. A neuron implements a transfer function by which a number of inputs are used to generate an output. In some example embodiments, the inputs are weighted and summed, with the result compared to a threshold to determine if the neuron should generate an output signal (e.g., a 1) or not (e.g., a 0 output). The inputs of the component neurons are modified through the training of a neural network. One of skill in the art will appreciate that neurons and neural networks may be constructed programmatically (e.g., via software instructions) or via specialized hardware linking each neuron to form the neural network.

An example type of layer in the neural network 320 is a Long Short Term Memory (LSTM) layer. An LSTM layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input. Thus, the coefficients assign significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, DNNs, genetic or evolutionary algorithms, and the like.

With the help of natural language processing (NLP) and advanced data pre-processing, a machine learning model (e.g., the neural network 320) can be trained on all historical (existing) business entities (for instance, incidents, email interactions, etc.) from the system to assign them with a certain set of keywords or a dominant topic label based on textual fields such as description, subject, and so forth.

A topic label can be a human-readable phrase or word specific to the industry that it belongs to. It can be determined based on a set of keywords. For instance, if an object contains a long text of multiple words, this model will detect the most "relevant" and "important" keywords and assign them to different ensembles based on multiple factors. Some factors include feature importance and linguistic proximity. Feature importance is an NLP technique used to determine the most important and relevant textual fields provided from an input. Linguistic proximity refers to a distance between vector representations of keywords in two (or more) textual inputs. Additional factors include word commonalities, n-gram commonalities, and the like.

Related data objects may be assigned a human-legible "topic." Based on the existing topics and the contents of a new data object, the new data object is automatically assigned to one of the existing topics.

The transformer architecture processes an entire input at once rather than sequentially. For example, a RNN processes words or sentences sequentially, with the output of the RNN treated as an input for each input after the first (thus the use of the word "recurrent" in the name). As a result, relationships between elements that are far apart in the input are difficult to detect. The transformer architecture receives a larger input and learns the interrelationships between the elements and the output using an attention mechanism. Since all elements are processed together, distance between the elements of the input does not affect the learning process.

The neural network 320 may be used for recommendation generation by training with source domain data 310 comprising resolved support tickets as input and a tool used to resolve the support ticket as the label for the input. The trained neural network 320 will then generate tool recommendations as the result 360 based on new support ticket data.

Figure 4:
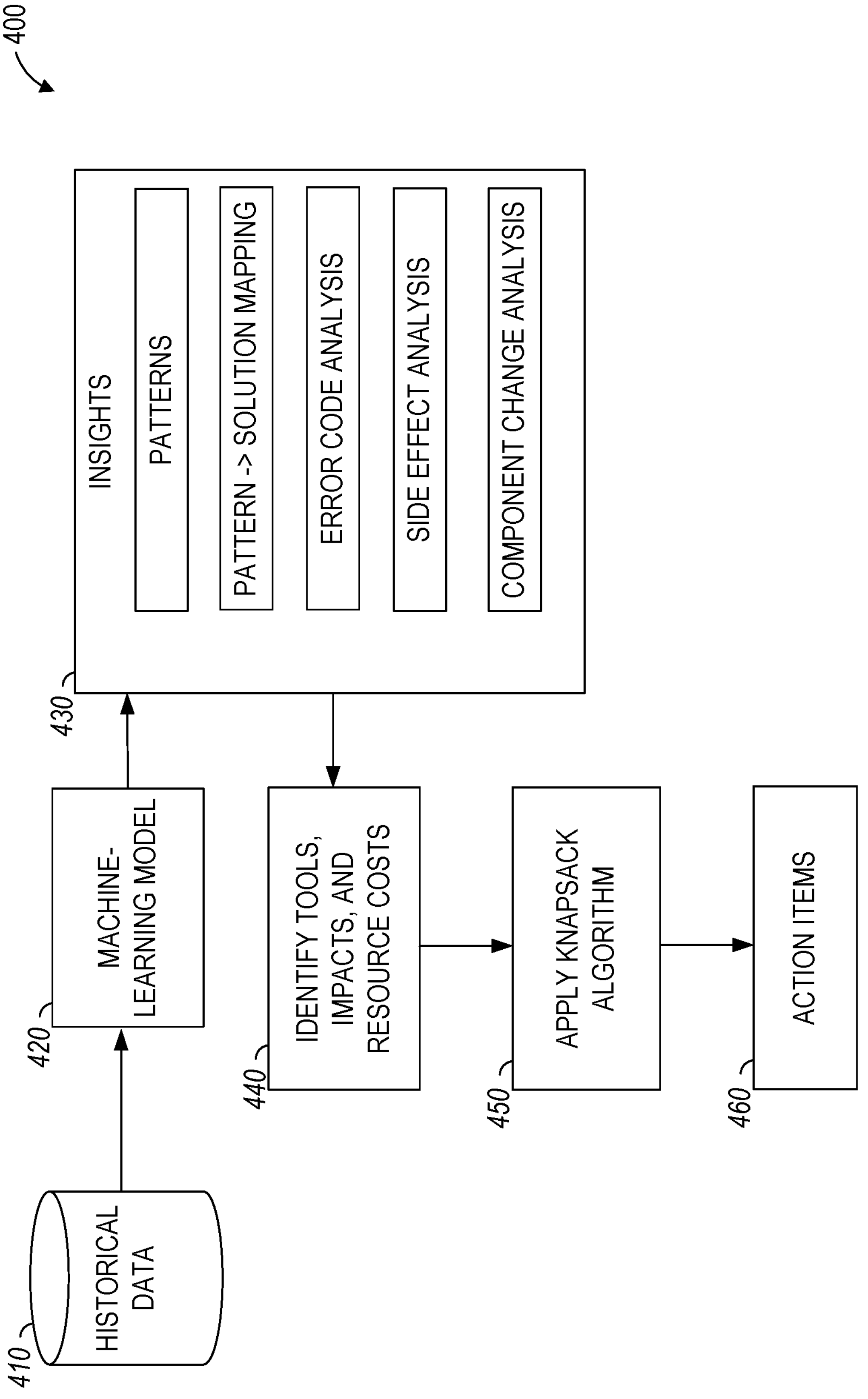
FIG. 4 is a block diagram illustrating a process using a knapsack-based recommendation engine in recommending tools for automating support, according to some example embodiments.

FIG. 4 is a block diagram illustrating a process 400 using a knapsack-based recommendation engine in recommending tools for automating support, according to some example embodiments. The process 400 begins by providing historical data 410 to a machine-learning model 420. The machine-learning model 420 generates, based on the historical data 410, insights 430. Based on the insights 430, a set of tools 440 are identified, along with the impact and cost of each tool. A knapsack algorithm 450 is applied to the set of identified tools 440 to generate a set of action items 460.

The historical data 410 may include support tickets that comprise one or more of: an identifier of a product or product component for which the support ticket was raised, text describing the problem for which support is requested, a timestamp (e.g., date, time, or both) indicating when the support ticket was created, a timestamp indicating when the support ticket was closed, text describing the solution for the support ticket, data indicating whether the support ticket was transferred between support personnel, and the like. In some example embodiments, the historical data 410 is selected from a larger body of historical data. For example, historical data for many products may be stored but the historical data 410 may be selected from the historical data for many products by filtering for support tickets concerning a single product.

The machine-learning model 420 may be trained or tuned using the historical data 410. Alternatively or additionally, the machine-learning model 420 may receive the historical data 410 as input and generate the insights 430 as output. The insights 430 may include patterns, pattern-to-solution mappings, error code analysis, side effect analysis, component change analysis, or any suitable combination thereof.

Pattern analysis considers the problem description text data in the historical data 410 to find clusters of recurring issues. The patterns identified by pattern analysis reflect the issues that are experienced by multiple customers over a period of time (e.g., one month or one year). The support tickets are grouped together based on context and similarity of title and description text. The context may be inferred using a transformer, a deep-learning model designed to process sequential data, making it suitable for natural language processing tasks. The input to the transformer is data in a raw format (e.g., text data without preprocessing) and the output is an embedding which captures the semantic information of the input data.

Titles of the support tickets may be compared using a cosine similarity metric defined as:

$$\text{Similarity}(A, B) = \frac{A \cdot B}{|A||B|}$$

where A and B are vector embeddings obtained as an output of the transformer. Larger values indicate higher similarity between the two titles, with 1 indicating that the semantic meaning is identical and 0 indicates no similarity in the semantic meanings. Similarity between support tickets based on context, title, and description text is used to cluster the support tickets. Each cluster is a "pattern" of related problems being experienced by users.

Once the patterns are identified, the solutions used to resolve each support ticket in a cluster are considered. For example, the solutions may include changes to a software product's source code, configuration changes deployed by support staff, or manual changes implemented by the customer. Solution analysis determines which solutions have been effective for the cluster and the percentage of support tickets for which each solution has been effective. For example, if three solutions were used to resolve support tickets in a cluster, the solution analysis identifies the three solutions and determines the relative effectiveness (e.g., 87% for the first solution, 10% for the second solution, and 3% for the third solution). The impact of implementing a solution may be found by determining the percentage of support tickets that can be handled by the solution multiplied by the number of support tickets expected in the cluster over a period of time and the average amount of time taken to handle each support ticket in the cluster. For example, if the solution handles 60% of the support tickets in the cluster, 100 support tickets in the cluster are expected over the next year, and the average support ticket in the cluster takes 3 person-hours to handle, the impact of the solution over the next year is 0.6×100×3=180 person-hours. Thus, the impact for each solution may depend on the probability of success of the solution in handling each support ticket in the cluster.

Component change analysis determines if and how often the product component associated with each support ticket changes. This identifies problems where users frequently mistake one product component for another, resulting in the support ticket being allocated to the wrong support staff, increasing handling time.

Error code analysis considers error codes generated by the product and provided by the customer in the support tickets. This identifies problems associated with recurring error codes. Side effect analysis identifies additional problems ("side effects") that were created when solutions for support tickets were attempted.

Additional types of analysis used to generate the insights 430 may include checking the incidents where the solution was provided manually in the ticket and the customer's problem was resolved. Similar solutions to similar problems may be identified. Another one of the insights 430 may be generated based on checking the number of inconsistency-based incidents and the reports suggested to fix them. An analysis tool may navigate a support assistant tree to determine if any known patterns are not addressed by the support assistant tree. The distribution of incidents between multiple levels of support may be analyzed to determine if a pattern has an unusually high rate of problem escalation, and thus is consuming more expensive high-level support resources. The trend of each pattern over a period of time (e.g., a number of years) may be analyzed to determine if the frequency of the pattern is increasing or decreasing. The distribution of support tickets (e.g., month by month or year by year) may be analyzed to find anomalies in the distribution. Any correlation between the frequency of support tickets and the versions of software release may be identified.

The results of the analyses are the insights 430, a set of results that identify the problem areas in a product or product component in multiple ways. The next step is to identify the tools 440 that can resolve the problem areas, enhance the deflection rate of support tickets, provide efficiency gains to support staff, or any suitable combination thereof. The knapsack algorithm 450 uses not only the tools 440 but also data for the impact and cost of each tool.

For example, the historical data 410 may include many support tickets that were solved by existing notes in a knowledge base that is available for customers to search. A note is a written solution that can include step-by-step instructions on how to solve an issue. The machine-learning model 420 determines this and the insights 430 include this relationship between the support tickets and their solutions. A database is accessed to determine which tool to use to increase the number of support tickets that can be preempted by having customers find the corresponding notes in the knowledge base. In this example, a Keyword Recommender may be used to generate keywords to be added to existing notes to improve the ability of customers to find the responsive notes.

The cost of implementing the Keyword Recommender may be calculated as (Number of Notes to be Edited)×(Time per Note). The Number of Notes to be Edited may be determined from the support tickets, each of which may indicate the responsive note that solved the problem. The Time per Note may be looked up in a database. For example, an initial Time per Note may be estimated by a manager and adjusted over time as notes are edited and productivity is measured.

The impact of implementing the Keyword Recommender may be calculated as (Percentage of Customers that Use the Knowledge Base)×(Number of Tickets Solvable Using the Enhanced Notes)×(Time per Ticket). For example, if 30% of customers are willing and able to use a knowledge base to solve their problems without raising support tickets and 100 tickets are estimated to be raised on the topic in the next period of time (e.g., month, quarter, or year) and would be addressed by the enhanced notes, then implementing the Keyword Recommender will deflect 30 support tickets over that period of time. Thus, if the cost of implementing the Keyword Recommender is less than the cost of providing support for the avoided 30 support tickets, it may be beneficial to implement the Keyword Recommender.

As another example, the machine-learning model 420 may generate insights 430 that show that a cluster of support tickets are solved by first level support staff referring to a small set of notes. A database is accessed to determine which tool to use to best help customers find a correct note from among a small set (e.g., from among a set of notes numbering below a predetermined threshold such as 3 notes, 5 notes, 10 notes, or 12 notes). The identified tool may be a Support Assistant Tree that guides a user to a responsive note by asking a short series of multiple choice questions (e.g., true/false questions, yes/no questions, or questions that allow the user to select from three to five options).

The cost of implementing a Support Assistant Tree may be calculated as (Number of Leaves)×(Time per Leaf). The Number of Leaves may be determined from the support tickets, each of which may indicate the responsive note that solved the problem. The leaves of the Support Assistant Tree are the responsive notes. The Time per Leaf may be looked up in a database. For example, an initial Time per Leaf may be estimated by a manager and adjusted over time as Support Assistant Trees are implemented, and productivity is measured.

The impact of implementing the Support Assistant Tree may be calculated as (Percentage of Customers that Use the Support Assistant Tree)×(Number of Tickets Solvable Using the Support Assistant Tree)×(Time per Ticket). For example, if 30% of customers are willing and able to use a Support Assistant Tree to solve their problems without raising support tickets and 50 tickets are estimated to be raised on the topic in the next period of time (e.g., month, quarter, or year) and would be addressed by the enhanced notes, then implementing the Support Assistant Tree will deflect 15 support tickets over that period of time. Thus, if the cost of implementing the Keyword Recommender is less than the cost of providing support for the avoided 15 support tickets, it may be beneficial to implement the Keyword Recommender.

As another example, the machine-learning model 420 may generate insights 430 that show that a cluster of support tickets are solved by support staff providing written solutions to customers. The written solutions provided in the support tickets are similar (e.g., have similar semantic meanings as determined by a machine-learning model) but provided separately by different support engineers across multiple customer tickets. Similar solution is repeated across various tickets and if a similar problem arises in future there is no way to reuse the same solution since it is not documented in a standard way. A database is accessed to determine which tool to use to best help customers find answers when similar written solutions are provided. The identified tool may be to create a knowledge base article having these recurring solutions to recurring issues which allows users to search for solutions to known problems. In many cases, a knowledge base already exists, and thus the recommendation is to add a knowledge base article that addresses the particular problem experienced by users that generated support tickets in the cluster.

The cost of adding a knowledge base article (KBA) is the time required to create the KBA, which can be further divided into the sum of the Time to Write the KBA, the Time to Review the KBA, and the Time to Deploy the KBA. Despite the similar semantic meanings of the written responses, it may be that multiple KBAs are generated to address the cluster of support tickets. In this case, the cost of adding the KBA is further multiplied by the number of KBAs.

The impact of adding one or more KBAs may be calculated as (Percentage of Customers that Use the Knowledge Base)×(Number of Tickets Solvable Using the Added KBAs)×(Time per Ticket). For example, if 20% of customers are willing and able to use a knowledge base to solve their problems without raising support tickets and 100 tickets are estimated to be raised on the topic in the next period of time (e.g., month, quarter, or year) and would be addressed by the enhanced notes, then implementing the KBAs will deflect 20 support tickets over that period of time. Thus, if the cost of implementing the KBAs is less than the cost of providing support for the avoided 20 support tickets, it may be beneficial to implement the KBAs.

As another example, the insights 430 may show a cluster of support tickets with related problems and for which the number of communications between the user and the support staff was higher than a predetermined threshold. This may indicate that the initial information provided by the support staff was consistently insufficient to resolve the problem. A database is accessed to determine which tool to use to best help customers find answers in this situation. The identified tool may be to educate support staff to help them more quickly recognize the particular problem associated with the cluster.

The cost of training may be determined as the (Time to Prepare Training)+(Presentation Time)×(Number of Trained Staff). The impact of training may be calculated as (Percentage of Clustered Tickets Affected)×(Predicted Number of Clustered Tickets)×(Time Reduction per Ticket). For example, if, after training, staff are 80% effective at recognizing the problem, 100 tickets are estimated to be raised in the cluster in the next predetermined period of time, and each ticket will be resolved 15 minutes faster, the time savings of the training is 20 hours over the period of time. Thus, if fewer than 20 hours are spent creating and performing the training, it may be beneficial to provide the training.

As yet another example, the insights 430 may show a cluster of support tickets that were not solvable by first level support staff, were escalated to second level support staff, and consumed more than a predetermined amount of time (e.g., 15 days or 30 days) of second level support staff. This may indicate that second level support staff are not sufficiently familiar with the problem. As above, training may be recommended. Another tool is an Intelligent Correction Predictor (ICP), such as a machine-learning model trained to recognize the semantic meaning of support tickets and recommend solutions associated with past support tickets having similar semantic meanings.

The cost of implementing an ICP is the (Time to Prepare and Validate the ICP)+(Time to Train Staff to Use the ICP). The impact of the ICP is the (Number of Tickets Solved Using the ICP)×(Average Processing Time for Past Tickets)×(Percentage Reduced Processing Time due to ICP). For example, the Time to Prepare and Validate the ICP may be four person-days, the Time to Train Staff to Use the ICP may be one person-day, the Number of Tickets Solved Using the ICP may be 100, the Average Processing Time for Past Tickets may be 7.5 person-days, and the Percentage Reduced Processing Time due to ICP may be 40%. In this example, the cost of implementing the ICP would be five person-days and the effect would be 300 person-days.

The cost of implementing a tool or the amount of resources used by the tool may be determined based on application deployment information. For example, historical application deployment information may indicate a number of person-hours used in deploying the tool in the past. The historical application deployment information may include additional details, such as a measure of the size of the deployment. For example, the effort taken to deploy an ICP to recognize different support tickets may depend on the number of different support tickets supported, such that the application deployment information shows a linear, quadratic, or exponential relationship between the effort and the number of different support tickets supported. Based on this data, the appropriate calculation may be performed to estimate the cost of implementing the tool for the cluster being addressed.

Based on the identified tools 440, the impact of each identified tool, and the resource costs of each identified tool, the knapsack algorithm 450 is applied to generate the action items 460. The effort required may be determined as a sum of a training effort required to begin use of the tool and an implementation effort required to use the tool. As an example, the input to the knapsack algorithm 450 may include the data shown in Table 1 below.

TABLE 1

| Tool | Effort Required (in person-days) | Impact (person-days saved) |
|---|---|---|
| Intelligent Keyword Recommender | 15 | 100 |
| Support Assistant Tree | 35 | 280 |
| KBA Recommender | 62 | 150 |
| Updating Top Notes | 5 | 50 |
| Training Staff | 9 | 150 |
| Intelligent Correction Predictor | 5 | 300 |

The knapsack algorithm 450 maximizes the value (impact) of tools within a maximum available effort. The knapsack algorithm 450 may either use a "normal knapsack," in which items may be fractionally chosen (e.g., the results may be full implementation of the CP and 50% implementation of a Support Assistant Tree) or a "0/1 knapsack," in which items are either taken as a whole or not taken at all. In various example embodiments, either type of knapsack algorithm 450 may be used.

To select tools using a normal knapsack, the Impact/Effort ratio is determined by dividing the Impact by the Effort Required. This indicates the amount of impact that will be generated by implementing each tool for each unit of effort spent. Using Table 1 as an example, Table 2 below is generated.

TABLE 2

| Tool | Impact/Effort Ratio |
|---|---|
| Intelligent Keyword Recommender | 6.6 |
| Support Assistant Tree | 8 |
| KBA Recommender | 2.41 |
| Updating Top Notes | 10 |
| Training Staff | 16.6 |
| Intelligent Correction Predictor | 60 |

As can be seen in Table 2, the ICP has the highest Impact/Effort Ratio. Considering a situation in which 50 person-days of effort are available, the first tool added to the knapsack is the 5 person-days of effort of ICP (the total time to completely implement the tool, as shown in Table 1). After adding ICP to the knapsack, 45 days of effort remain available. The tool with the next-highest Impact/Effort Ratio, Training Staff, is selected. Training Staff uses 9 person-days of effort, and thus fits completely in the knapsack with 36 person-days of effort remaining. The knapsack algorithm 450 continues by selecting Updating Top Notes, with the highest Impact/Effort Ratio of the remaining tools. Updating Top Notes uses 5 person days of effort, also fitting completely in the knapsack, which now has 31 person-days of effort remaining. Next added is the Support Assistant Tree, with an Impact/Effort Ratio of 8. Fully implementing the Support Assistant Tree would take 35 person-days of effort, more than what is available in the knapsack. Accordingly, the Support Assistant Tree is fractionally (31/35 or approximately 89%) selected to fill the knapsack.

Figure 5:
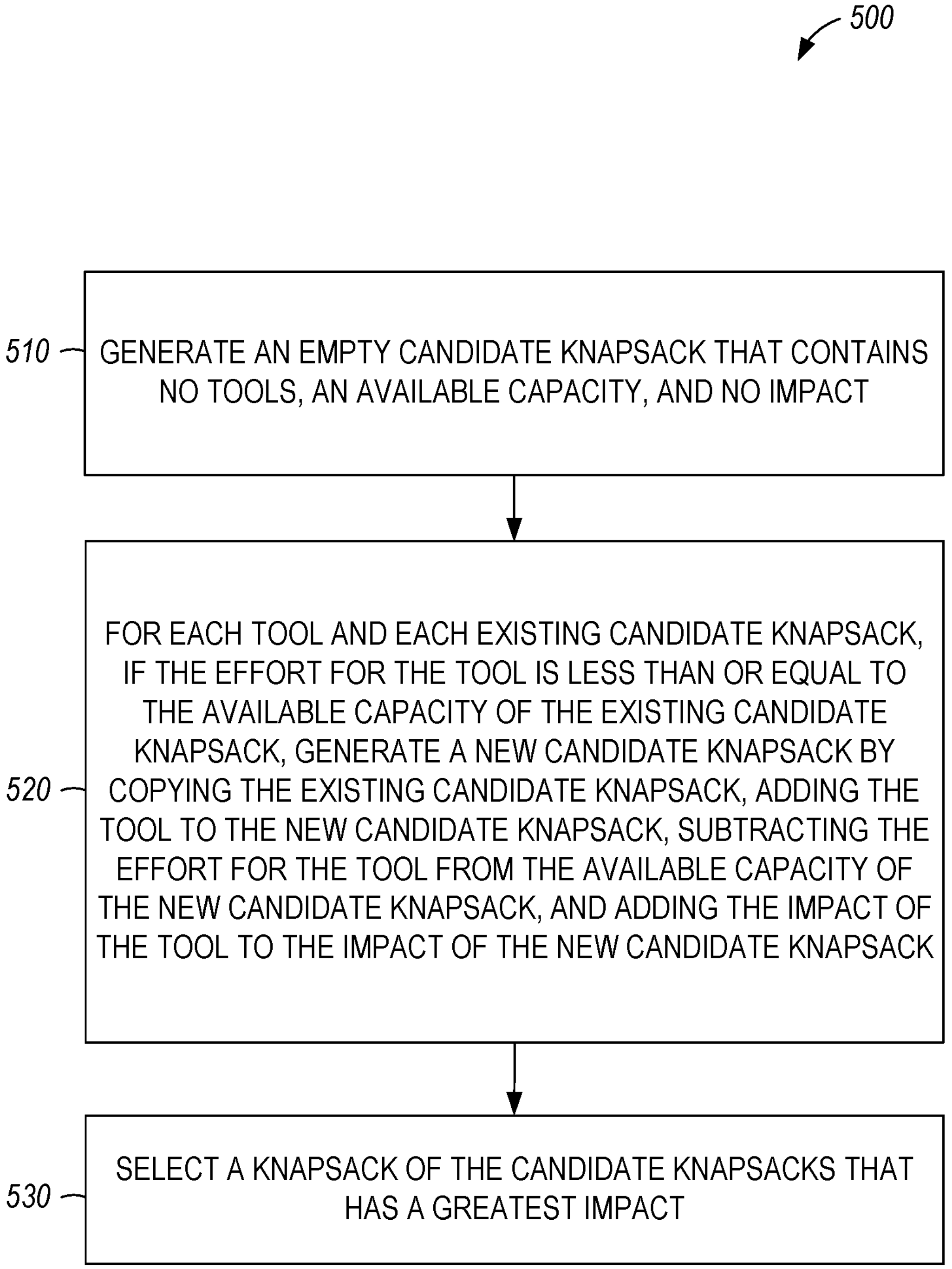
FIG. 5 is a flowchart illustrating operations of an example method suitable for selecting automated support tools to improve efficiency of handing support requests.

FIG. 5 is a flowchart illustrating operations of an example method 500 suitable for selecting automated support tools to improve efficiency of handing support requests. The method 500 may be used as the knapsack algorithm 450 in the process of FIG. 4. Using a 0/1 knapsack, various combinations of tools are considered to determine which combination provides the maximum impact while consuming no more resources than are available.

The knapsack algorithm seeks to maximize the number of person-days saved, which can be represented as:

$$\max \sum_{i=0}^{n} X_i S_i$$

where, i is the index of tools among n available tools, $X_i$ is a binary variable with a value of 0 for an unselected tool and 1 for a selected tool, $S_i$ is the person-days saved for implementing the ith tool.

The selection is subject to constraints:

$$G \geq \sum_{i=0}^{n} X_i E_i$$

where, $E_i$ is the person-days effort required for the ith tool,

G is the total person-days available for implementing tools.

In operation 510, the recommendation server 140 generates an empty candidate knapsack that contains no tools, an available capacity (e.g., a number of person-days of effort available to implement tools to improve the support process), and a zero impact. For example, the available capacity may be 50 person-days of effort.

The recommendation server 140 iterates over each tool and each existing candidate knapsack in operation 520. For the first tool, there is only one candidate knapsack, the empty candidate knapsack that was created in operation 510. If the effort of the tool is less than or equal to the available capacity of the existing candidate knapsack, the recommendation server 140 generates a new candidate knapsack that is a copy of the existing candidate knapsack, adds the tool to the new candidate knapsack, subtracts the effort for the tool from the available capacity of the new candidate knapsack, and adds the impact of the tool to the impact of the new candidate knapsack. The impact of the tool may be based on a probability of success for the tool.

For example, with reference to Table 1, the first tool is the Intelligent Keyword Recommender. The effort for the Intelligent Keyword Recommender is 15 person-days, which is less than or equal to the available capacity (50 person-days) of the first (empty) candidate knapsack. Accordingly, a new (second) candidate knapsack is created that includes the Intelligent Keyword Recommender, has 35 person-days of availability, and has an impact of 100, the impact of the Intelligent Keyword Recommender.

Iterating continues with the second tool, the Support Assistant Tree. The Support Assistant Tree consumes 35 person-days of effort, which is less than or equal to the available capacity of the first (empty) candidate knapsack. As a result, a new (third) candidate knapsack is created that includes the Support Assistant Tree, has 15 person-days of availability, and has an impact of 280, the impact of the Support Assistant Tree. The effort for the Support Assistant Tree is also less than or equal to the available capacity of the second candidate knapsack. Accordingly, a new (fourth) candidate knapsack is created that includes the Intelligent Keyword Recommender and the Support Assistant Tree, has no availability, and has an impact of 380.

The third tool, the KBA Recommender, has an effort of 62 person-days. This is greater than the available capacity of the four candidate knapsacks, so no new candidate knapsacks are created that include the KBA Recommender.

Updating Top Notes has an effort of 5 person-days. This fits in all but the fourth candidate knapsack. Accordingly, three new candidate knapsacks (fifth-seventh candidate knapsacks) are generated: one including only Updating Top Notes, one including Intelligent Keyword Recommender and Updating Top Notes, and one including Support Assistant Tree and Updating Top Notes. The three new candidate knapsacks have available capacity of 45, 30, and 10 person-days and impacts of 50, 150, and 330, respectively.

The effort for Training Staff is 9 person-days, which fits in all but the fourth candidate knapsack. As a result, six new candidate knapsacks (eighth-thirteenth candidate knapsacks) are generated, each of which is a copy of one of the existing candidate knapsacks (excluding the fourth candidate knapsack) with Training Staff added. The six new candidate knapsacks have available capacity of 41, 26, 6, 36, 21, and 1, and impacts of 150, 250, 430, 200, 300, and 480, respectively.

Lastly, the effort for Intelligent Correction Predictor is 5 person-days, which fits in all but the fourth and thirteenth candidate knapsacks. As a result, eleven new candidate knapsacks (fourteenth to twenty-third candidate knapsacks) are generated, each of which is a copy of one of the existing candidate knapsacks (excluding the fourth and thirteenth candidate knapsacks), with Intelligent Correction Predictor added. The impacts of the eleven new candidate knapsacks are 300, 400, 580, 350, 450, 630, 450, 550, 730, 500, and 600.

In operation 530, the recommendation server 140 selects a knapsack of the candidate knapsacks that has a greatest impact. The knapsack with the greatest impact is the twenty-first candidate knapsack, with an impact of 730. This knapsack was generated while processing the Intelligent Correction Predictor and includes the Intelligent Correction Predictor, Training Staff, and Support Assistant Tree.

The method 500 will always identify the knapsack that provides the greatest impact with the available resources. However, the number of knapsacks that will be considered may be very large. In the example above, twenty-three knapsacks were generated while selecting among five tools, one of which was easily disregarded because it did not fit even into an empty knapsack. As the number of tools grows and the size of the knapsack (relative to the resource costs of the tools) increases, the number of possible knapsacks increases exponentially. For example, if there are twenty-five tools available and all possible combinations of tools fit in the knapsack, $2^{25}$ knapsacks—over 3,000,000—will be generated and considered.

Figure 6:
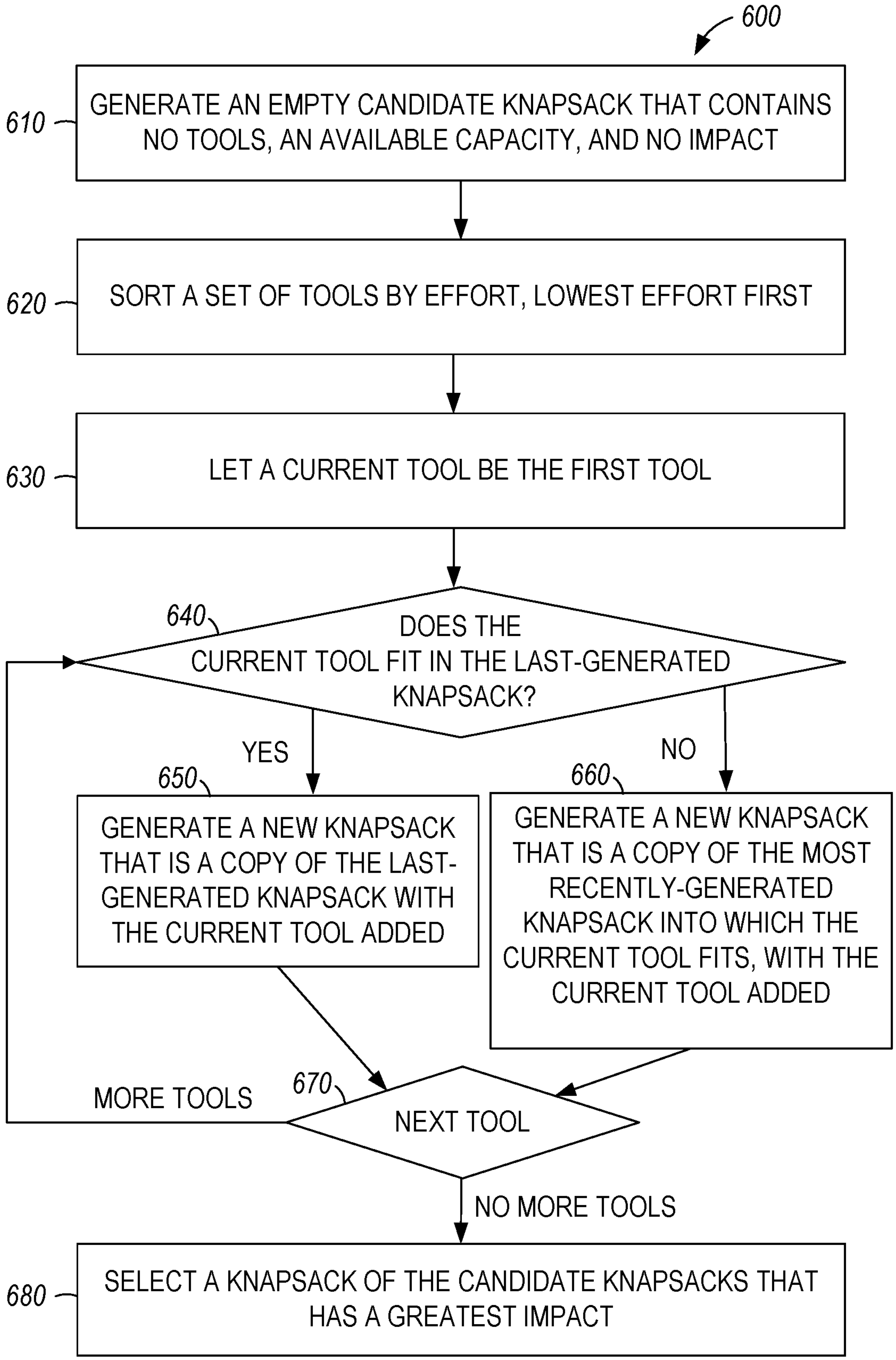
FIG. 6 is a flowchart illustrating operations of an example method suitable for selecting automated support tools to improve efficiency of handing support requests.

FIG. 6 is a flowchart illustrating operations of an example method 600 suitable for selecting automated support tools to improve efficiency of handing support requests. By comparison with the method 500, the method 600 will not always find the optimum knapsack. However, the number of knapsacks that will be considered is much lower. The knapsack that is found by the method 600 will often be the optimum knapsack or another knapsack that is acceptably close in impact. The method 500 may be used as the knapsack algorithm 450 in the process of FIG. 4. Using a 0/1 knapsack, various combinations of tools are considered to determine which combination to use without consuming more resources than are available.

In operation 610, the recommendation server 140 generates an empty candidate knapsack that contains no tools, an available capacity (e.g., a number of person-days of effort available to implement tools to improve the support process), and a zero impact. For example, the available capacity may be 50 person-days of effort.

The recommendation server 140, in operation 620, sorts a set of tools by effort, lowest effort first. When two tools have the same effort, the tools are sorted by impact, highest impact first. For example, beginning with Table 1, the tools are sorted to generate Table 3, below.

TABLE 3

| Tool | Effort Required (in person-days) | Impact (person-days saved) |
|---|---|---|
| Intelligent Correction Predictor | 5 | 300 |
| Updating Top Notes | 5 | 50 |
| Training Staff | 9 | 150 |
| Intelligent Keyword Recommender | 15 | 100 |
| Support Assistant Tree | 35 | 280 |
| KBA Recommender | 62 | 150 |

Operations 640-670 are performed in an iterative fashion, once for each tool. In operation 630, a current tool to be operated on by operations 640-670 is set to the first tool in the sorted list. In this example, the current tool is initialized to the Intelligent Correction Predictor.

In operation 640, the size of the tool (measured in effort required) is compared to the remaining capacity of the last-generated knapsack to determine whether to perform operation 650 or operation 660. For the first iteration, the last-generated knapsack is the empty candidate knapsack that was created in operation 610. The empty candidate knapsack has 50 person-days of effort available. The Intelligent Correction Predictor requires five person-days of effort. Accordingly, the current tool fits in the last-generated knapsack, and the method 600 continues with operation 650.

Since the current tool fits in the last-generated knapsack, the recommendation server 140 generates a new knapsack that is a copy of the last-generated knapsack with the current tool added (operation 650). After a new candidate knapsack is created with the Intelligent Correction Predictor included, the list of candidate knapsacks is as shown in Table 4, below.

TABLE 4

| Tools | Capacity Remaining (in person-days) | Impact (person-days saved) |
|---|---|---|
| None | 50 | 0 |
| Intelligent Correction Predictor | 45 | 300 |

In operation 670, the current tool is updated to be the next tool in the sorted list of tools. In this example, the second tool is Updating Top Notes. Updating Top Notes fits in the last-generated knapsack (operation 640), so operation 650 is performed. In operation 650, a new knapsack is created that is a copy of the last-created knapsack and also includes Updating Top Notes. After a new candidate knapsack is created with the Updating Top Notes included, the list of candidate knapsacks is as shown in Table 5, below.

TABLE 5

| Tools | Capacity Remaining (in person-days) | Impact (person-days saved) |
|---|---|---|
| None | 50 | 0 |
| Intelligent Correction Predictor | 45 | 300 |
| Intelligent Correction Predictor, Updating Top Notes | 40 | 350 |

In the next iteration of operation 640, the recommendation server 140 determines that Training Staff fits in the last-created knapsack and a new knapsack is created that is a copy of the last-created knapsack and also includes Training Staff. After this knapsack is created, the list of candidate knapsacks is as shown in Table 6, below.

TABLE 6

| Tools | Capacity Remaining (in person-days) | Impact (person-days saved) |
|---|---|---|
| None | 50 | 0 |
| Intelligent Correction Predictor | 45 | 300 |
| Intelligent Correction Predictor, Updating Top Notes | 40 | 350 |
| Intelligent Correction Predictor, Updating Top Notes, Training Staff | 31 | 500 |

The Intelligent Keyword Recommender is considered in the next iteration of operation 640. The Intelligent Keyword Recommender fits in the last-created knapsack, and so a new knapsack is created that is a copy of the last-created knapsack and also includes Intelligent Keyword Recommender. After this knapsack is created, the list of candidate knapsacks is as shown in Table 7, below.

TABLE 7

| Tools | Capacity Remaining (in person-days) | Impact (person-days saved) |
|---|---|---|
| None | 50 | 0 |
| Intelligent Correction Predictor | 45 | 300 |
| Intelligent Correction Predictor, Updating Top Notes | 40 | 350 |
| Intelligent Correction Predictor, Updating Top Notes, Training Staff | 31 | 500 |
| Intelligent Correction Predictor, Updating Top Notes, Training Staff, Intelligent Keyword Recommender | 16 | 600 |

In the next iteration of operation 640, the recommendation server 140 determines that Support Assistant Tree does not fit in the last-created knapsack. The Support Assistant Tree requires 35 person-days of effort, and the last-created knapsack has only 16 person-days remaining. As a result, operation 660 is performed. In operation 660, the recommendation server 140 generates a new knapsack that is a copy of the most recently generated knapsack into which the current tool fits, with the current tool added. The last-created knapsack has a capacity of 16, which is insufficient. The knapsack created immediately previously has a capacity of 31, which is also insufficient. The knapsack before that has a capacity of 40, which is greater than or equal to the 35 needed for Support Assistant Tree. Accordingly, a new knapsack is created that is a copy of the knapsack in the third row of Table 7 and also includes Support Assistant Tree. After this knapsack is created, the list of candidate knapsacks is as shown in Table 8, below.

TABLE 7

| Tools | Capacity Remaining (in person-days) | Impact (person-days saved) |
|---|---|---|
| None | 50 | 0 |
| Intelligent Correction Predictor | 45 | 300 |
| Intelligent Correction Predictor, Updating Top Notes | 40 | 350 |
| Intelligent Correction Predictor, Updating Top Notes, Training Staff | 31 | 500 |
| Intelligent Correction Predictor, Updating Top Notes, Training Staff, Intelligent Keyword Recommender | 16 | 600 |
| Intelligent Correction Predictor, Updating Top Notes, Support Assistant Tree | 5 | 630 |

In the next iteration, the KBA Recommender is considered. The KBA Recommender consumes 62 person-days of effort and does not fit in the last-generated knapsack (operation 640). In operation 660, no knapsack is found into which the KBA Recommender fits. Accordingly, no new candidate knapsack is generated. Since the KBA Recommender is the last tool, the method 600 continues with operation 680.

In operation 680, the recommendation server 140 selects a knapsack of the candidate knapsacks that has a greatest impact. In this example, the last knapsack generated has the greatest impact, 630 person-days, so this is the knapsack that is selected. As can be seen by comparison with the results of the method 500, this is not the global optimum knapsack. However, only six knapsacks were generated instead of twenty-three. In real-world examples with larger numbers of tools, the computational savings is even greater.

FIG. 7 is a block diagram illustrating a database schema 700 suitable for use by a knapsack-based recommendation engine, according to some example embodiments. The database schema 700 includes an historical data table 710 and a tools table 740. The historical data table 710 includes rows 730A, 730B, and 730C of a format 720. The tools table 740 includes rows 760A, 760B, and 760C of a format 750. Though only a few rows and tables of the database schema 700 are shown, this is by way of example only. The tools table 740 may contain information for dozens or hundreds of tools. The historical data table 710 may contain data for millions of support tickets for hundreds or thousands of products or product components. The database schema 700 may include many additional tables to store data for users, customers, tools, support tickets, products, and the like.

Each row of the historical data table 710 includes data for a support ticket, such as the component for which support was requested, the start date on which the support ticket was created, the end date on which the support ticket was resolved, and additional data regarding the support ticket. For example, the data field may contain text provided by the person that generated the support ticket, text provided by the person handling the support ticket, data generated by diagnostic tools, data from a knowledge base, or any suitable combination thereof. Data in the historical data table 710 may be used as the historical data 410 in FIG. 4 to train the machine-learning model 420 to generate insights 430.

The tools table 740 contains information about tools that are available. Each of the rows 760A-760C includes a name of a tool, an amount of effort required to implement the tool, an impact of implementing the tool, and the impact/effort ratio. Data in the tools table 740 may be used by the recommendation server 140 of FIG. 1 to select tools to recommend. For example, the methods 500 and 600 of FIGS. 5-6 may use data from the tools table 740 to determine which tools to select.

Figure 8:
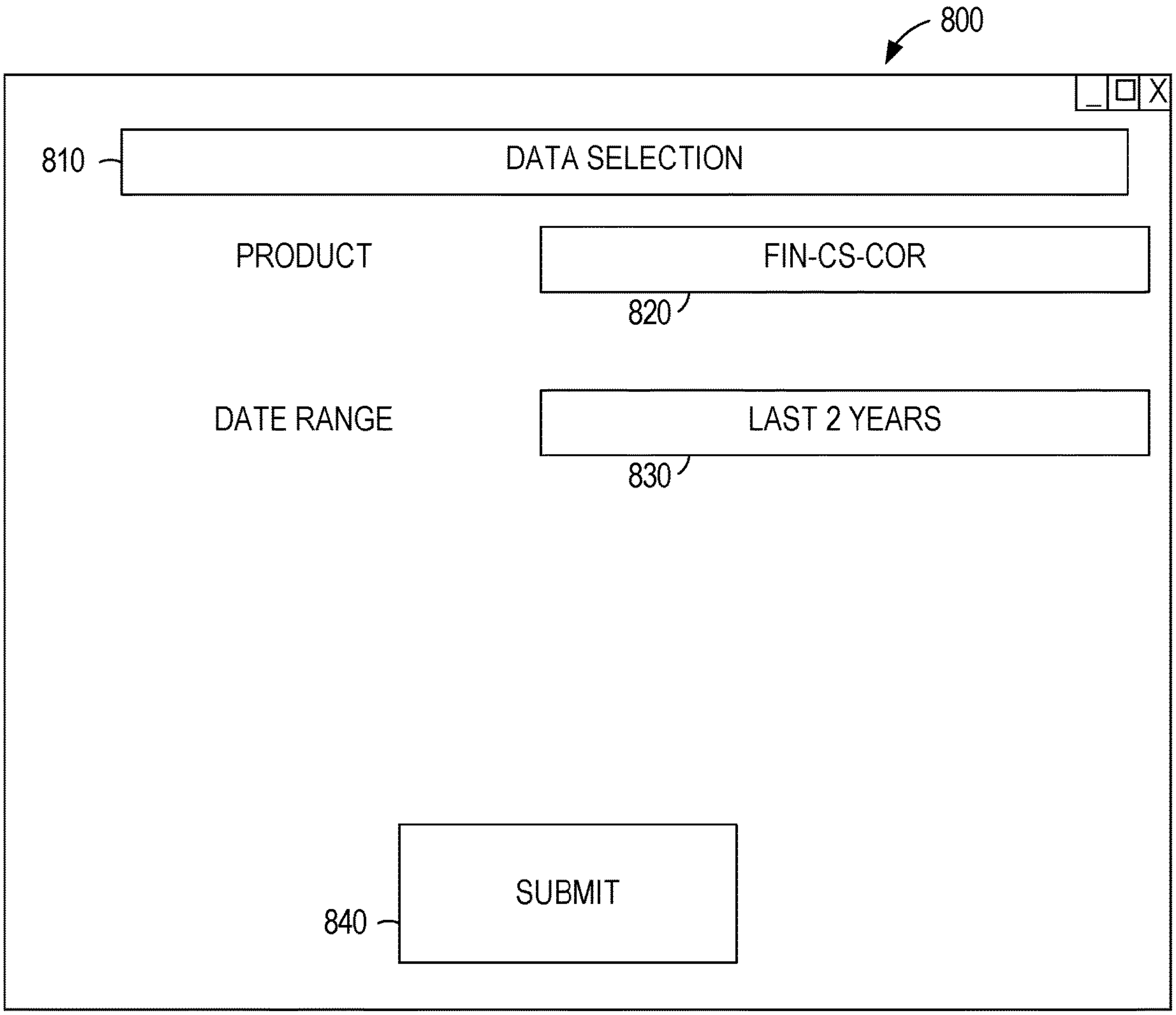
FIG. 8 is a block diagram illustrating a user interface for selecting support tickets to analyze for identifying automated support tools, according to some example embodiments.

FIG. 8 is a block diagram illustrating a user interface 800 for selecting support tickets to analyze for identifying automated support tools, according to some example embodiments. The user interface 800 includes a title 810, input fields 820 and 830, and a button 840. By way of example and not limitation, the user interface 800 may be generated by the user interface module 240 of the recommendation server 140 (with reference to FIGS. 1-2) and presented on a display device of the client device 160A or 160B of FIG. 1. For example, a web server running on the recommendation server 140 may generate an HTML file and send the generated HTML file to the client device 160A via the network 190, for rendering by a web browser running on the client device 160A, resulting in the web interface 170 being presented, comprising the user interface 800.

The title 810 indicates that the user interface 800 is used for selecting data. The field 820 receives a selection of a product or product component. For example, the field 820 may be a text field into which the user can enter text, a drop-down selector that the user can use to select a product or product component from a predefined list, or any suitable combination thereof. The field 830 receives a selection of a date range. For example, the field 830 may comprise a pair of date pickers that, together, allow the user to select a start and end date for a date range. As another example, the field 830 may be a drop-down selector that the user can use to select a date range from a predefined list.

The button 840 is operable to submit the selected product and date range to the recommendation server 140. Based on the product and date range, the recommendation server 140 accesses a set of support tickets from the database server 150. For example, rows from the historical data table 710 of FIG. 7 may be selected where the component of the row equals the product, and the start date is within the date range. The accessed rows may be used as the historical data 410 in the process 400 of FIG. 4.

Figure 9:
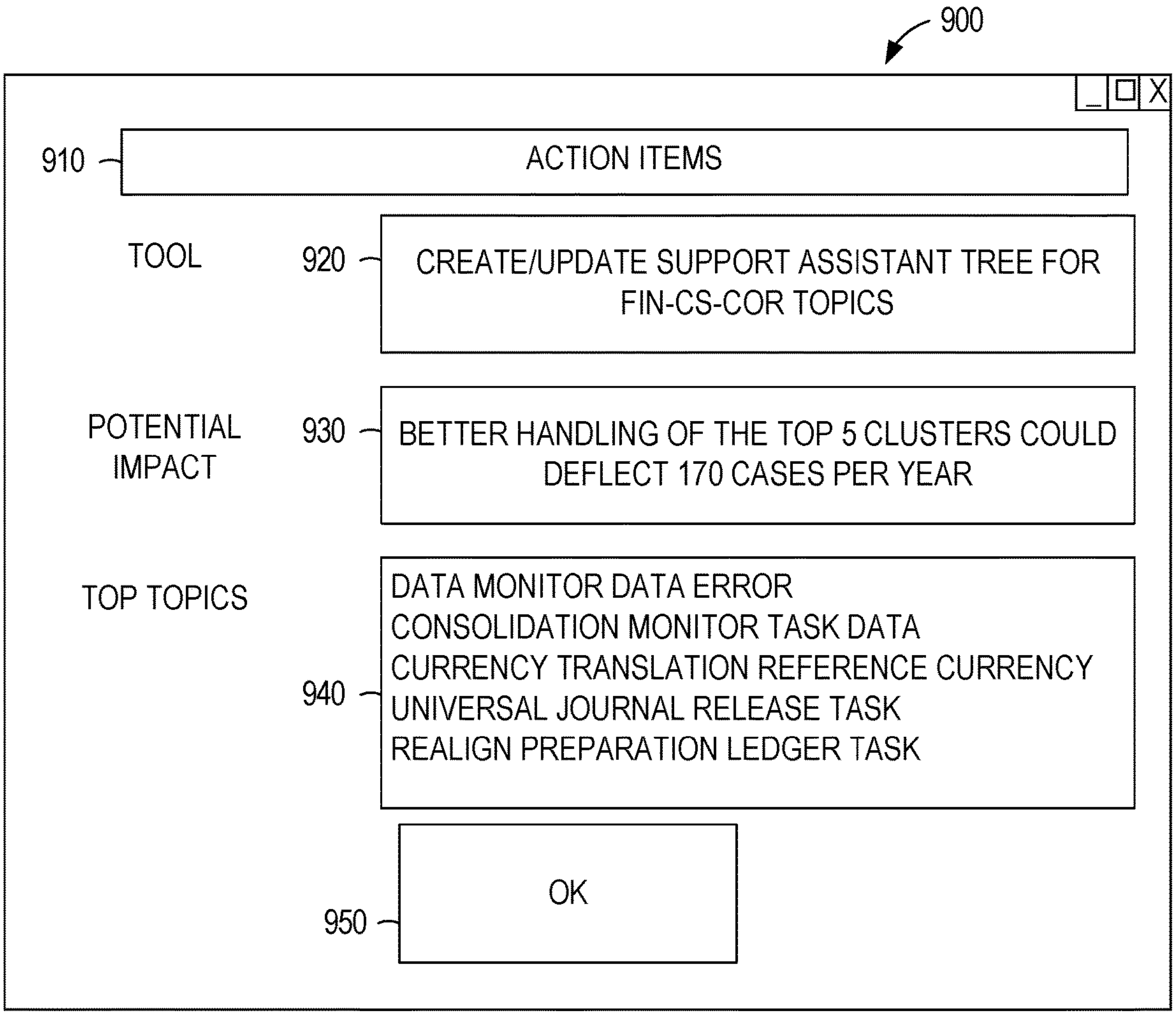
FIG. 9 is a block diagram illustrating a user interface for presenting recommended automated support tools selected by a knapsack-based recommendation engine, according to some example embodiments.

FIG. 9 is a block diagram illustrating a user interface 900 for presenting recommended automated support tools selected by a knapsack-based recommendation engine, according to some example embodiments. The user interface 900 includes a title 910, text 920, 930, and 940, and a button 950. By way of example and not limitation, the user interface 900 may be generated by the user interface module 240 of the recommendation server 140 (with reference to FIGS. 1-2) and presented on a display device of the client device 160A or 160B of FIG. 1. The user interface 900 may be presented with the action items 460 in the process 400 of FIG. 4.

The title 910 indicates that the user interface 900 is used to identify action items for implementing improvements to a support system. The text 920 identifies a tool to be used or action to be taken. For example, in FIG. 9, the text 920 indicates that the user should create or update a support assistant tree for topics for the product FIN-CS-COR.

The potential impact of implementing the recommended tool is shown in the text 930. In this example, the text 930 indicates that better handling of the top 5 clusters of support requests could deflect 170 cases per year from support staff. The topics of the top 5 clusters are identified in the text 940. Thus, using the information presented in the user interface 900, a support professional is enabled to focus efforts in improving automated tools to reduce the level of effort needed to support a product. The button 950 may be operable by the user to dismiss the user interface 900.

Figure 10:
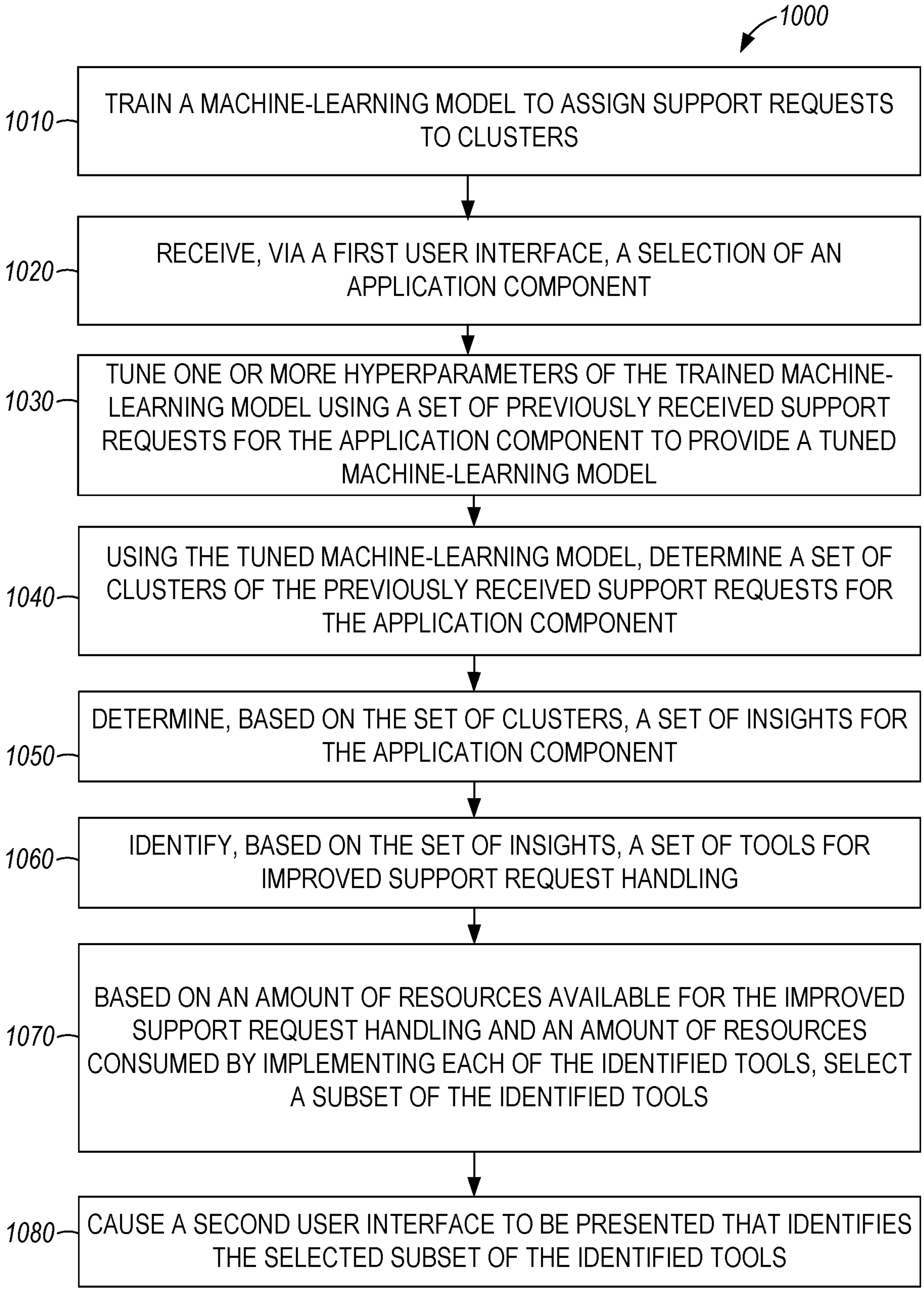
FIG. 10 is a flowchart illustrating operations of an example method suitable for selecting automated support tools to improve efficiency of handing support requests.

FIG. 10 is a flowchart illustrating operations of an example method 1000 suitable for selecting automated support tools to improve efficiency of handling support requests. By way of example and not limitation, the method 1000 may be performed by the recommendation server 140 of FIG. 1, using the modules shown in FIG. 2, the database schema 700 of FIG. 7, and the user interface 900 of FIG. 9.

In operation 1010, the machine-learning module 220 trains a machine-learning model to assign support requests to clusters. For example, a machine-learning model may be trained on a large amount of data in the historical data table 710 for multiple products and a large date range.

The communication module 210 receives, via a first user interface, a selection of an application component (operation 1020). For example, the user interface 800 may be presented and the user may select an application component (labeled "product" in FIG. 8), a date range, or both.

One or more hyperparameters of the machine-learning module 220, in operation 1030, are tuned using a set of previously received support requests for the application component to provide a tuned machine-learning model. The tuning may be based on the text which describes the problem/issue faced by customer in each support request of the set of previously received support requests for the application component. The hyperparameters (e.g., the weights of the top layer of the trained machine learning model) are tuned iteratively and the combination which provides the best result is selected and used further Thus, in some example embodiments, the recommendation server 140 causes a user interface to be presented that includes an option to select filters comprising a selected application component and a selected date range. The recommendation server 140 may select, from a database, a set of support requests to use based on the selected filters.

In operation 1040, the tuned machine-learning model is used to determine a set of clusters of the previously received support requests for the application component. For example, the support requests in a cluster may have similar descriptions, solutions, length between opening and closing dates, or any suitable combination thereof.

In addition to generating clusters, various types of analysis like solution analysis, component change analysis, error code analysis are performed a generate a unique set of insights for a particular application component (operation 1050). For these set of insights generated, the recommendation module 230 identifies, from a set of tools for improved support request handling (operation 1060). For example, the support requests as per the first insight may each have been recategorized from a first tool to a second tool before being resolved. Accordingly, a recommended tool may be to update a Keyword Recommender based on text in a support request to suggest the correct tool before a support ticket is created. As another example, the support requests as determined by the second insight may each have been resolved by directing the user to an existing knowledge base article. Accordingly, a recommended tool may be to update a Support Assistant Tree to include the information from the knowledge base, allowing the user to resolve the issue without creating a support ticket. In some example embodiments, multiple tools are identified for one or more generated insights.

In operation 1070, the recommendation module 230, based on an amount of resources available for the improved support request handling and an amount of resources consumed by implementing each of the identified tools, selects a subset of the identified tools. For example, the method 600 of FIG. 6 may be used to select a knapsack comprising a set of tools, wherein the tools identified in the operation 1040 are the set of tools used in operation 620.

The user interface module 240, in operation 1080, causes a second user interface to be presented that identifies the selected tools. For example, the user interface 900 of FIG. 9 may be presented.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: a memory that stores instructions; and one or more processors coupled to the memory and configured to execute the instructions to perform operations comprising: training a machine-learning model to assign support requests to clusters; tuning the trained machine-learning model with a set of support requests for an application component; using the tuned machine-learning model, determine a set of clusters of support requests for the application component; generate insights, based on the support requests in the application component, identifying a tool for improving support request handling from a set of tools; based on an amount of resources available for improving support request handling and an amount of resources consumed by implementing each of the identified tools, selecting a subset of the identified tools; and causing a user interface to be presented that identifies the selected subset of the identified tools.

In Example 2, the subject matter of Example 1, wherein the selecting of the subset of the identified tools is further based on an impact for each tool of the subset of identified tools.

In Example 3, the subject matter of Example 2, wherein the operations further comprise: determining, for each tool of the subset of identified tools, the amount of resources consumed by implementing the tool based on application deployment information.

In Example 4, the subject matter of Examples 1-3, wherein the operations further comprise: causing a second user interface to be presented, the second user interface comprising an option to select filters comprising a selected application component and a selected date range; and selecting, from a database, the set of support requests for the application component based on the selected filters.

In Example 5, the subject matter of Examples 1-4, wherein the operations further comprise: using a Cosine similarity measure to compare support requests assigned to a single cluster to determine if the single cluster includes unrelated support requests; and based on the cluster including unrelated support requests, adjusting parameters of the machine-learning model and repeating the tuning of the machine-learning model.

In Example 6, the subject matter of Examples 1-5, wherein the operations further comprise: using a Cosine similarity measure to compare support requests assigned to different clusters to determine if the clusters include related support requests; and based on the different clusters including related support requests, adjusting parameters of the machine-learning model and repeating the tuning of the machine-learning model.

In Example 7, the subject matter of Examples 1-6, wherein: the trained machine-learning model determines vectors representing semantic meaning for support requests; and the assigning of support requests to clusters comprises determining cosine similarities for the vectors.

Example 8 is a non-transitory computer-readable medium that stores instructions that, when executed by one or more processors, cause the one or more processors to perform operations comprising: training a machine-learning model to assign support requests to clusters; tuning the trained machine-learning model with a set of support requests for an application component; using the tuned machine-learning model, determine a set of clusters of support requests for the application component; generate insights based on the support requests in the application component, identifying a tool for improving support request handling from a set of tools; based on an amount of resources available for improving support request handling and an amount of resources consumed by implementing each of the identified tools, selecting a subset of the identified tools; and causing a user interface to be presented that identifies the selected subset of identified tools.

In Example 9, the subject matter of Example 8, wherein the selecting of the subset of the identified tools is further based on an impact for each tool of the subset of identified tools.

In Example 10, the subject matter of Example 9, wherein the operations further comprise: determining, for each tool of the subset of identified tools, the amount of resources consumed by implementing the tool based on application deployment information.

In Example 11, the subject matter of Examples 8-10, wherein the operations further comprise: causing a second user interface to be presented, the second user interface comprising an option to select filters comprising a selected application component and a selected date range; and selecting, from a database, the set of support requests based on the selected filters.

In Example 12, the subject matter of Examples 8-11, wherein the operations further comprise: using a Cosine similarity measure to compare support requests assigned to a single cluster to determine if the single cluster includes unrelated support requests; and based on the single cluster including unrelated support requests, adjusting parameters of the machine-learning model and repeating the tuning of the machine-learning model.

In Example 13, the subject matter of Examples 8-12, wherein the operations further comprise: using a Cosine similarity measure to compare support requests assigned to different clusters to determine if the clusters include related support requests; and based on the different clusters including related support requests, adjusting parameters of the machine-learning model and repeating the tuning of the machine-learning model.

In Example 14, the subject matter of Examples 8-13, wherein: the trained machine-learning model determines vectors representing semantic meaning for support requests; and the assigning of support requests to clusters comprises determining cosine similarities for the vectors.

Example 15 is a method comprising: training, by one or more processors, a machine-learning model to assign support requests to clusters; tuning the trained machine-learning model with a set of support requests for an application component; using the tuned machine-learning model, determine a set of clusters of support requests for the application component; generate insights based on the support requests in the application component, identifying a tool for improving support request handling from a set of tools; based on an amount of resources available for improving support request handling and an amount of resources consumed by implementing each of the identified tools, selecting a subset of the identified tools; and causing a user interface to be presented that identifies the selected subset of the identified tools.

In Example 16, the subject matter of Example 15, wherein the selecting of the subset of the identified tools is further based on an impact for each tool of the subset of the identified tools.

In Example 17, the subject matter of Example 16 includes, determining, for each tool of the subset of identified tools, the amount of resources consumed by implementing the tool based on application deployment information.

In Example 18, the subject matter of Examples 15-17 includes, causing a second user interface to be presented, the second user interface comprising an option to select filters comprising a selected application component and a selected date range; and selecting, from a database, the set of support requests based on the selected filters.

In Example 19, the subject matter of Examples 15-18 includes, using a Cosine similarity measure to compare support requests assigned to a single cluster to determine if the cluster includes unrelated support requests; and based on the cluster including unrelated support requests, adjusting parameters of the machine-learning model and repeating the tuning of the machine-learning model.

In Example 20, the subject matter of Examples 15-19 includes, using a Cosine similarity measure to compare support requests assigned to different clusters to determine if the clusters include related support requests; and based on the different clusters including related support requests, adjusting parameters of the machine-learning model and repeating the tuning of the machine-learning model.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Figure 11:
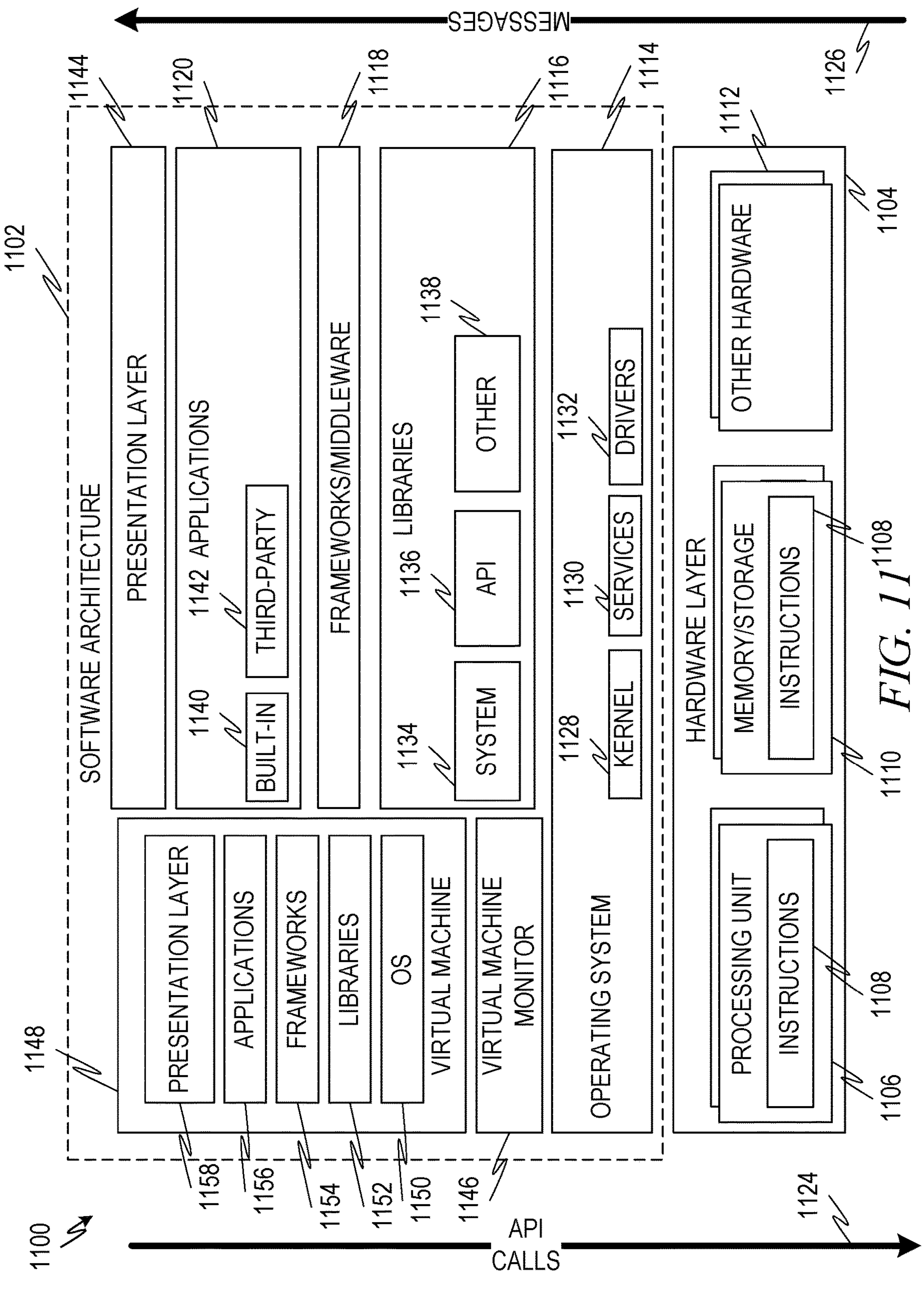
FIG. 11 is a block diagram showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively, or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. The processor or processors may be located in a single location (e.g., within a home environment, an office environment, or a server farm), or the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

Figure 12:
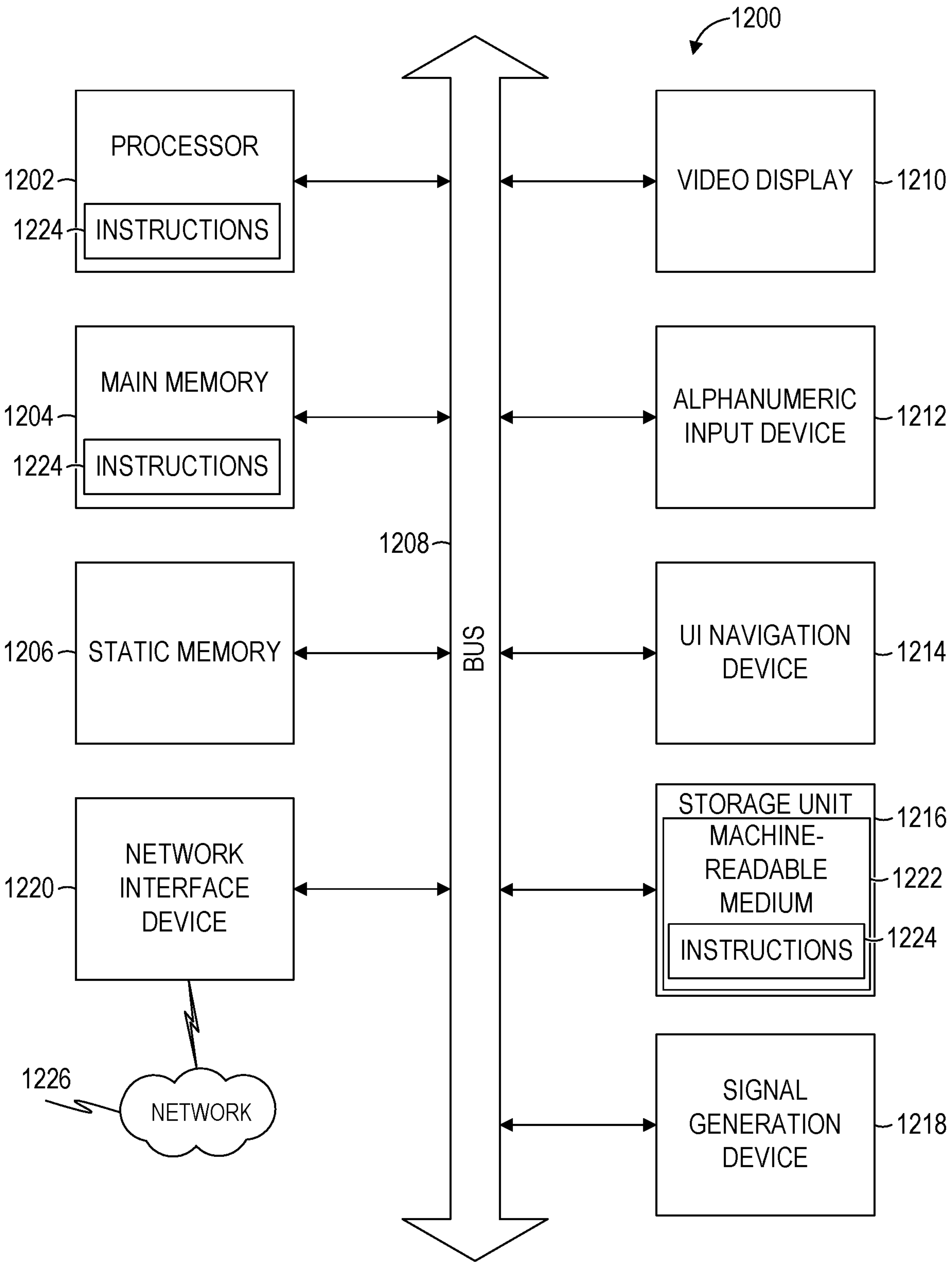
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting a machine-readable medium 1222.

While the machine-readable medium 1222 is shown in FIG. 12 to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:
a memory that stores instructions; and
one or more processors coupled to the memory and configured to execute the instructions to perform operations comprising:
training a machine-learning model to assign support requests to clusters, resulting in a trained machine-learning model;
receiving, via a first user interface, a selection of an application component;
tuning one or more hyperparameters of the trained machine learning model using a set of previously received support requests for the selected application component to provide a tuned machine-learning model;
determining, using the tuned machine-learning model, a set of clusters of the previously received support requests for the application component;
determining, based on the set of clusters, a set of insights for the application component;
identifying, based on the set of insights, a set of tools for improved support request handling;
based on an amount of resources available for the improved support request handling and an amount of resources consumed by implementing each of the identified tools, selecting a subset of the identified tools, the selecting comprising:
generating a candidate knapsack having an available capacity corresponding to the amount of resources available;
sorting the set of tools by an effort to implement each tool;
for each tool of the sorted set of tools, in order, determining whether the tool fits within a remaining capacity of a most recently generated candidate knapsack and, based on the determining, generating a further candidate knapsack that is a copy of a most recently generated candidate knapsack into which the tool fits with the tool added; and
selecting, as the subset of the identified tools, a candidate knapsack having a greatest impact; and
causing a second user interface to be presented that identifies the selected subset of the identified tools, including a name of a tool, a potential impact of the tool, and a topic of support request handling aided by the tool.

2. The system of claim 1, wherein the operations further comprise:
causing the first user interface to be presented, the first user interface comprising an option to select filters comprising the selected application component and a selected date range; and
selecting, from a database, the set of previously received support requests for the application component based on the selected filters.

3. The system of claim 1, wherein the operations further comprise:
using a Cosine similarity measure to compare support requests assigned to a single cluster to determine if the single cluster includes unrelated support requests; and
based on the single cluster including unrelated support requests, adjusting parameters of the machine-learning model and repeating the tuning of the machine-learning model.

4. The system of claim 1, wherein the operations further comprise:
using a Cosine similarity measure to compare support requests assigned to different clusters to determine if the clusters include related support requests; and
based on the different clusters including related support requests, adjusting parameters of the machine-learning model and repeating the tuning of the machine-learning model.

5. The system of claim 1, wherein:
the trained machine-learning model determines vectors representing semantic meaning for the previously received support requests for the application component; and
the determining of the set of clusters of the previously received support requests for the application component comprises determining cosine similarities for the vectors.

6. The system of claim 1, wherein the sorting of the set of tools by an effort to implement each tool comprises sorting the set of tools by the effort to implement of each tool from lowest effort to highest effort and, for two tools having a same effort to implement, sorting the two tools by an impact of each of the two tools from highest impact to lowest impact.

7. The system of claim 1, wherein:
the tuned machine-learning model determines vectors representing semantic meaning for the previously received support requests for the application component;
the determining of the set of clusters comprises computing Cosine similarities for the vectors; and
the operations further comprise:
computing, using a Cosine similarity measure, a similarity of the previously received support requests assigned to a single cluster of the set of clusters to determine whether the single cluster includes unrelated support requests; and
based on the single cluster including unrelated support requests, adjusting the one or more hyperparameters of the machine-learning model and repeating the tuning of the machine-learning model.

8. The system of claim 1, wherein:
an impact of each tool of the set of tools is based on a probability of success of the tool in handling each support request of a cluster of the set of clusters and a number of support requests in the cluster; and
the operations further comprise determining, for each tool of the set of tools, the amount of resources consumed by implementing the tool based on application deployment information indicating a number of person-hours used in deploying the tool.

9. A non-transitory computer-readable medium that stores instructions that, when executed by one or more processors, cause the one or more processors to perform operations comprising:
training a machine-learning model to assign support requests to clusters, resulting in a trained machine-learning model;
receiving, via a first user interface, a selection of an application component;
tuning one or more hyperparameters of the trained machine learning model using a set of previously received support requests for the selected application component to provide a tuned machine-learning model;

determining, using the tuned machine-learning model, a set of clusters of the previously received support requests for the application component;

determining, based on the set of clusters, a set of insights for the application component;

identifying, based on the set of insights, a set of tools for improved support request handling;

based on an amount of resources available for the improved support request handling and an amount of resources consumed by implementing each of the identified tools, selecting a subset of the identified tools, the selecting comprising:

generating a candidate knapsack having an available capacity corresponding to the amount of resources available;

sorting the set of tools by an effort to implement each tool;

for each tool of the sorted set of tools, in order, determining whether the tool fits within a remaining capacity of a most recently generated candidate knapsack and, based on the determining, generating a further candidate knapsack that is a copy of a most recently generated candidate knapsack into which the tool fits with the tool added; and selecting, as the subset of the identified tools, a candidate knapsack having a greatest impact; and causing a second user interface to be presented that identifies the selected subset of the identified tools, including a name of a tool, a potential impact of the tool, and a topic of support request handling aided by the tool.

10. The non-transitory computer-readable medium of claim 9, wherein the operations further comprise:

causing the first user interface to be presented, the first user interface comprising an option to select filters comprising the selected application component and a selected date range; and selecting, from a database, the set of previously received support requests based on the selected filters.

11. The non-transitory computer-readable medium of claim 9, wherein the operations further comprise:

using a Cosine similarity measure to compare support requests assigned to a single cluster to determine if the single cluster includes unrelated support requests; and based on the single cluster including unrelated support requests, adjusting parameters of the machine-learning model and repeating the tuning of the machine-learning model.

12. The non-transitory computer-readable medium of claim 9, wherein the operations further comprise:

using a Cosine similarity measure to compare support requests assigned to different clusters to determine if the clusters include related support requests; and based on the different clusters including related support requests, adjusting parameters of the machine-learning model and repeating the tuning of the machine-learning model.

13. The non-transitory computer-readable medium of claim 9, wherein:

the trained machine-learning model determines vectors representing semantic meaning for the previously received support requests for the application component; and the determining of the set of clusters of the previously received support requests for the application component comprises determining cosine similarities for the vectors.

14. The non-transitory computer-readable medium of claim 9, wherein the sorting of the set of tools by an effort to implement each tool comprises sorting the set of tools by the effort to implement each tool from lowest effort to highest effort and, for two tools having a same effort, sorting the two tools by an impact of each of the two tools from highest impact to lowest impact.

15. The non-transitory computer-readable medium of claim 9, wherein:

the tuned machine-learning model determines vectors representing semantic meaning for the previously received support requests for the application component;

the determining of the set of clusters comprises computing Cosine similarities for the vectors; and the operations further comprise:

computing, using a Cosine similarity measure, a similarity of the previously received support requests assigned to a single cluster of the set of clusters to determine whether the single cluster includes unrelated support requests; and based on the single cluster including unrelated support requests, adjusting the one or more hyperparameters of the machine-learning model and repeating the tuning of the machine-learning model.

16. A method comprising:

training, by one or more processors, a machine-learning model to assign support requests to clusters, resulting in a trained machine-learning model;

receiving, via a first user interface, a selection of an application component;

tuning one or more hyperparameters of the trained machine learning model using a set of previously received support requests for the selected application component to provide a tuned machine-learning model;

determining, using the tuned machine-learning model, a set of clusters of the previously received support requests for the application component;

determining, based on the set of clusters, a set of insights for the application component;

identifying, based on the set of insights, a set of tools for improved support request handling;

based on an amount of resources available for the improved support request handling and an amount of resources consumed by implementing each of the identified tools, selecting a subset of the identified tools, the selecting comprising:

generating a candidate knapsack having an available capacity corresponding to the amount of resources available;

sorting the set of tools by an effort to implement each tool;

for each tool of the sorted set of tools, in order, determining whether the tool fits within a remaining capacity of a most recently generated candidate knapsack and, based on the determining, generating a further candidate knapsack that is a copy of a most recently generated candidate knapsack into which the tool fits with the tool added; and selecting, as the subset of the identified tools, a candidate knapsack having a greatest impact; and causing a second user interface to be presented that identifies the selected subset of the identified tools, including a name of a tool, a potential impact of the tool, and a topic of support request handling aided by the tool.

17. The method of claim 16, further comprising:

causing the first user interface to be presented, the first user interface comprising an option to select filters comprising the selected application component and a selected date range; and selecting, from a database, the set of support requests based on the selected filters.

18. The method of claim 16, further comprising:

using a Cosine similarity measure to compare support requests assigned to a single cluster to determine if the single cluster includes unrelated support requests; and based on the single cluster including unrelated support requests, adjusting parameters of the machine-learning model and repeating the tuning of the machine-learning model.

19. The method of claim 16, further comprising:

using a Cosine similarity measure to compare support requests assigned to different clusters to determine if the clusters include related support requests; and based on the different clusters including related support requests, adjusting parameters of the machine-learning model and repeating the tuning of the machine-learning model.

20. The method of claim 16, wherein:

an impact of each tool of the set of tools is based on a probability of success of the tool in handling each support request of a cluster of the set of clusters and a number of support requests in the cluster; and the method further comprises determining, for each tool of the set of tools, the amount of resources consumed by implementing the tool based on application deployment information indicating a number of person-hours used in deploying the tool.

* * * * *